US007158392B2

United States Patent
Hosokawa et al.

(10) Patent No.: US 7,158,392 B2
(45) Date of Patent: Jan. 2, 2007

(54) SWITCHING POWER SUPPLY DEVICE AND THE SEMICONDUCTOR INTEGRATED CIRCUIT FOR POWER SUPPLY CONTROL

(75) Inventors: Kyoichi Hosokawa, Takasaki (JP); Kenichi Onda, Hitachi (JP); Yoichi Uehara, Maebashi (JP); Ryotaro Kudo, Takasaki (JP); Shinichi Yoshida, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 262 days.

(21) Appl. No.: 10/727,601

(22) Filed: Dec. 5, 2003

(65) Prior Publication Data

US 2004/0136209 A1    Jul. 15, 2004

(30) Foreign Application Priority Data

Jan. 9, 2003    (JP)    ............................. 2003-002817

(51) Int. Cl.
  *H02M 3/335*    (2006.01)
(52) U.S. Cl. .................................................. 363/21.06
(58) Field of Classification Search ................. 363/17, 363/21.01, 21.06, 21.14, 24, 25, 26, 89, 127, 363/132
See application file for complete search history.

(56) References Cited

U.S. PATENT DOCUMENTS

| 5,414,609 | A  | * | 5/1995 | Levran et al. ................. 363/17 |
| 5,907,481 | A  | * | 5/1999 | Svardsjo ....................... 363/25 |
| 6,185,111 | B1 | * | 2/2001 | Yoshida ......................... 363/17 |
| 6,452,815 | B1 | * | 9/2002 | Zhu et al. ...................... 363/17 |
| 6,504,739 | B1 | * | 1/2003 | Phadke ......................... 363/127 |
| 6,574,124 | B1 | * | 6/2003 | Lin et al. ....................... 363/65 |
| 6,618,274 | B1 | * | 9/2003 | Boylan et al. ................. 363/17 |

* cited by examiner

*Primary Examiner*—Adolf Berhane
(74) *Attorney, Agent, or Firm*—Reed Smith LLP; Stanley P. Fisher, Esq.; Juan Carlos A. Marquez, Esq.

(57) ABSTRACT

It is aimed at decreasing losses not only in a synchronous rectifier circuit provided at a secondary side of a DC-DC converter, but also in a full-bridge switching circuit provided at a primary side thereof. The DC-DC converter comprises a transformer for voltage conversion, a synchronous rectifier circuit at the secondary side, and a full-bridge switching circuit at the primary side. The DC-DC converter performs synchronous rectifier control which uses switch transistors to change paths of currents flowing through the secondary coil in synchronization with switching operations at the primary side. The DC-DC converter detects currents flowing through a load at the secondary side, primary-side currents varying with the load currents, or primary-side input voltages to dynamically control off-timings of a synchronous rectification transistor at the secondary side. In addition, the DC-DC converter detects primary-side input voltages and currents flowing through the secondary-side load to dynamically control on-timings of a transistor in the primary-side switching circuit.

23 Claims, 15 Drawing Sheets

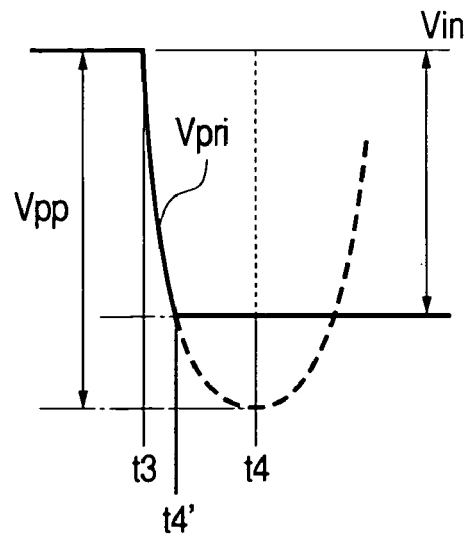
FIG. 11(iii)

SWITCHING POWER SUPPLY DEVICE AND THE SEMICONDUCTOR INTEGRATED CIRCUIT FOR POWER SUPPLY CONTROL

BACKGROUND OF THE INVENTION

The present invention relates to a technology for decreasing losses in a switching power supply device having a transformer for voltage conversion. More specifically, the present invention relates to a technology effectively used for DC-DC converters (power supply devices of direct current to direct current power converter type) having a synchronous rectifier circuit at the transformer's secondary side.

Conventionally, there is known a DC-DC converter as shown in FIG. 17. Such DC-DC converter uses a full-bridge switching circuit for the primary circuit and a synchronous rectifier circuit for the secondary rectifier circuit.

The DC-DC converter in FIG. 17 is a switching power circuit having the following configuration. The full-bridge switching circuit comprises switches SA through SD and drives a primary coil of a transformer TS1 with alternate currents. Synchronous rectification switches SE and SF are used to rectify alternate voltages induced at the secondary coil. Choke coils L1 and L2 alternately store energy to generate a desired direct current voltage in proportion to a windings ratio between the primary and secondary coils. The switches SA through SF comprise MOSFETs, for example. Diodes and parasitic capacitors parallel connected to the switches SA through SD indicate body diodes and parasitic capacitors each of which is provided between the source and the drain of each MOSFET.

While diodes are conventionally used as rectifier elements at the secondary side, the switches SE and SF comprising MOSFETs are used here to decrease power losses due to a forward voltage of the diode. If a voltage drop occurs between the source and the drain due to on-resistance of the MOSFET, the voltage drop can be made smaller than a forward voltage of the diode.

SUMMARY OF THE INVENTION

There is an increasing need for miniaturizing the DC-DC converter. To miniaturize the DC-DC converter, it is effective to miniaturize parts such as coils and capacitors. In order to miniaturize coils and capacitors, the switching frequency must be increased. However, increasing the switching frequency also increases switching losses and the heat release value. This necessitates a radiator plate and the like, resulting in unsuccessful miniaturization. Accordingly, it is important for miniaturization of the DC-DC converter to decrease switching losses and increase the switching frequency. For this purpose, the inventors made detailed examination of power losses in the DC-DC converter in FIG. 17.

FIG. 18 is a timing chart of signals OUT-A through OUT-D, OUT-E, and OUT-F. The signals OUT-A through OUT-D turn on or off switches SA through SD that drive the primary coil with alternate currents. The signals OUT-E and OUT-F control synchronous rectification switches SE and SF. When the primary coil is supplied with current as shown in FIG. 18, the DC-DC converter in FIG. 17 must turn of the synchronous rectification switch SE or SF. Otherwise, the secondary coil is short-circuited to prevent the power from being transmitted to the secondary coil from the primary coil. In addition, an overcurrent may be applied to the switches SA, SD, SE, and SF or the switches SB, SC, SE, and SF, thus destroying elements.

To solve this problem, the synchronous rectification switch SE is turned off when the primary coil is supplied with current in the direction of the arrow A. Alternatively, the synchronous rectification switch SF is turned off when the primary coil is supplied with current in the reverse direction of the arrow A. This control is made to transmit the power to the secondary coil and simultaneously rectify currents. The timing to turn off the switches SE and SF is synchronized to the timing to turn on or off the switches SA through SD that drive the primary coil. Consequently, it is desirable to use the drive signals OUT-A through OUT-D as the basis for generating the control signals OUT-E and OUT-F to control the synchronous rectification switches SE and SF.

However, timings of the control signals OUT-E and OUT-F that control the synchronous rectification switches SE and SF at the secondary side is uniquely determined based on the drive signals OUT-A through OUT-D at the primary side. Then, we found that, when a change occurs in input voltage Vin at the primary side or output current Iout at the secondary side, the off-timing of the switch SE or SF deviates from an optimum timing and a loss increases at the secondary side.

In order to decrease switching losses at the primary side, it is desirable to turn on or off the switches SA through SD for driving the primary coil with alternate currents in synchronization with 0 V for source-drain voltage Vds for the switches SA through SD. For this purpose, it is possible to consider a system that monitors potential V11 for a connection node between SA and SB, potential V12 for a connection node between SC and SD, and input voltage Vin and detects a timing to provide 0 V to source-drain voltage Vds for the switches SA through SD.

However, such control system causes a loss due to a delay generated between detection of Vds=0V and actually turning on or off SA through SD. Further, when the system monitors potential V11 for the connection node between SA and SB, potential V12 for the connection node between SC and SD, and input voltage Vin, there is another problem of increasing the number of external terminals for monitoring voltages.

It is an object of the present invention to provide a switching power supply device having a synchronous rectifier circuit at the secondary side of a transformer for voltage conversion with a technology capable of decreasing losses in the rectifier circuit at the secondary side, increasing a switching frequency, and miniaturizing a DC-DC converter.

It is another object of the present invention to provide a switching power supply device having a full-bridge switching circuit at the primary side of a transformer for voltage conversion with a technology capable of decreasing switching losses in the primary side, increasing the switching frequency, and miniaturizing a DC-DC converter.

It is still another object of the present invention to provide a switching power supply device and its control semiconductor integrated circuit capable of optimizing on-timing of a switch element at the primary side and off-timing of a synchronous rectification transistor at the secondary side for decreasing losses even if an input voltage or an output current changes.

It is yet another object of the present invention to provide a switching power supply device and its control semiconductor integrated circuit capable of optimizing on/off-timing of a switch element at the primary side and on/off-timing of a synchronous rectification transistor at the secondary side for decreasing losses without increasing the number of external terminals.

These and other objects and novel features of the invention may be readily ascertained by referring to the following description and appended drawings in this specification.

The following outlines major aspects of the present invention disclosed in this application.

According to a first aspect of the present invention, there is provided a switching power supply device such as a DC-DC converter having a transformer for voltage conversion and performing synchronous rectifier control that uses switch transistors to change paths of currents flowing through the secondary coil in synchronization with switching operations at the primary side. The switching power supply device is configured to detect currents flowing through a load at the secondary side, primary-side currents varying with the load currents, or primary-side input voltages to dynamically control off-timings of a synchronous rectification transistor at the secondary side.

According to the above-mentioned means, the synchronous rectification transistor can turn off at an optimal timing in accordance with changes in load currents at the secondary side or input voltages, making it possible to decrease losses at the secondary side.

According to a second aspect of the present invention, there is provided a switching power supply device having a transformer for voltage conversion and driving a primary coil with alternate currents by means of a full-bridge switching circuit to transmit power to a secondary coil. The switching power supply device is configured to detect primary-side input voltages and currents flowing through the secondary-side load to dynamically control on-timings of a transistor in the primary-side switching circuit.

According to the above-mentioned means, the transistor in the primary-side switching circuit can be turned on or off in a feed forward manner in accordance with changes in input voltages or load currents at the secondary side, making it possible to decrease switching losses at the primary side.

According to yet another aspect of the present invention, there is provided a switching power supply device having a transformer for voltage conversion and driving a primary coil with alternate currents by means of a full-bridge switching circuit to transmit power to a secondary coil. When the switching power supply device detects an input voltage at the primary side and a terminal voltage of the primary coil to control on/off-timings of the transistor in the switching circuit at the primary side, a comparator is configured to compare the detected voltage with its reference voltage that is predetermined to a slightly high value.

According to the above-mentioned means, an on/off control signal is generated before zeroing a source-drain voltage of the transistor in the switching circuit even if there is a delay in operations of the switching circuit at the primary side. The transistor in the switching circuit turns on or off simultaneously with setting the source-drain voltage to 0 V. It is possible to decrease switching losses at the primary side.

DETAILED DESCRIPTION OF THE PREFERRED EMBODIMENTS

Preferred embodiments of the present invention will be described in further detail with reference to the accompanying drawings.

Figure 1:
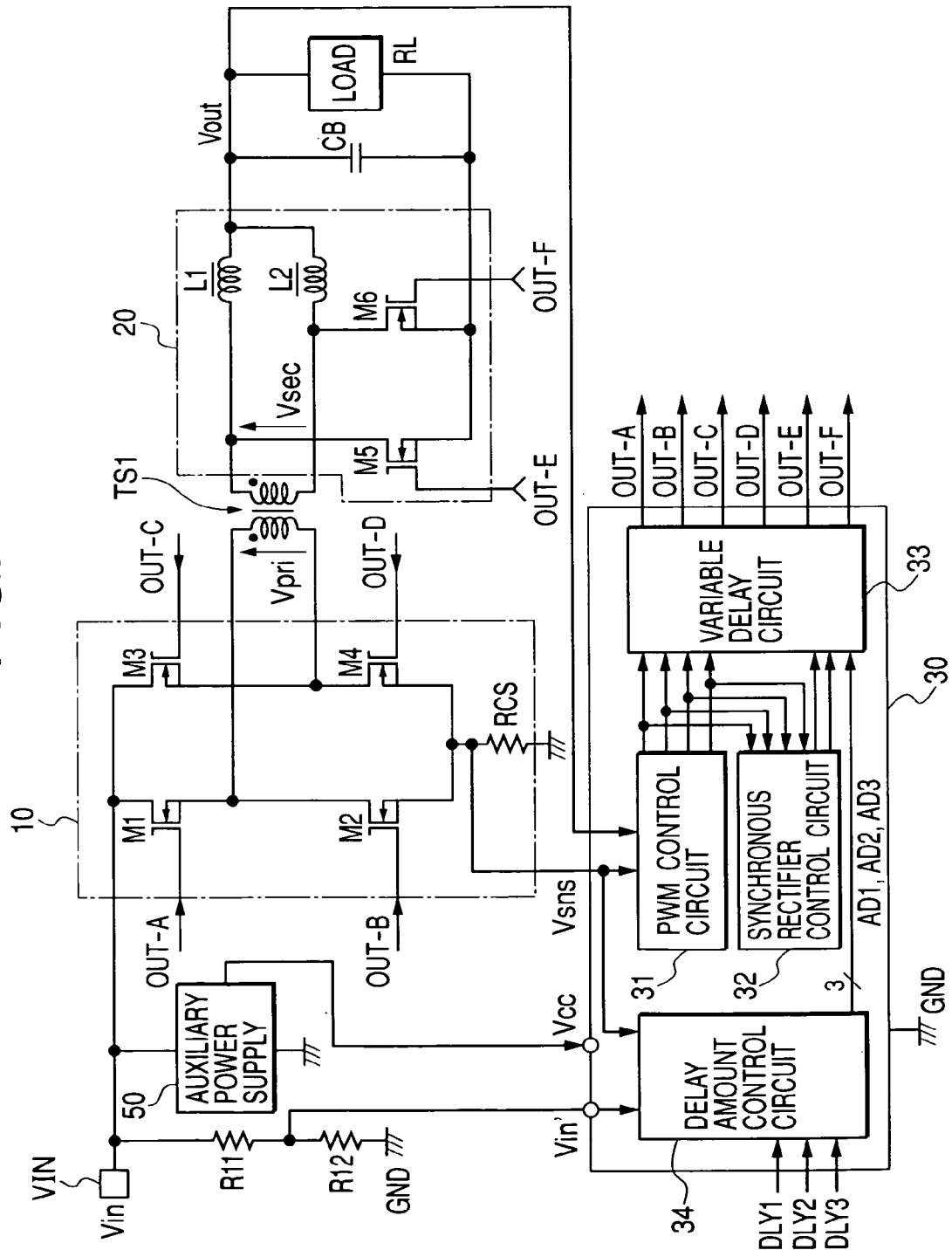
FIG. 1 is a schematic configuration diagram showing a first embodiment of a DC-DC converter according to the present invention.

FIG. 1 shows a first embodiment of a DC-DC converter according to the present invention. In FIG. 1, the reference symbol TS1 represents a transformer for voltage conversion. The reference numeral 10 represents a switching circuit to drive a primary coil of the transformer TS1 with alternate currents. The reference numeral 20 represents a full-wave rectifier circuit to rectify an AC voltage induced by the secondary coil of the transformer TS1 and convert the voltage into a DC voltage. The reference numeral 30 represents an integrated control circuit (hereafter referred to as a power control IC) to control to drive switch MOSFETs M1 through M4 constituting the above-mentioned switching circuit 10 and synchronous rectification MOSFETs M5 and M6 constituting the rectifier circuit 20. The reference numeral 50 represents an auxiliary power circuit such as a switching regulator that is supplied with 48 V input DC voltage Vin and generates to supply DC power voltage Vcc such as 12 V needed for the power control IC 30.

The reference symbol CB represents a smoothing capacitor to smooth a voltage rectified by the rectifier circuit 20. The reference numerals R11 and R12 represent divider resistors that divide the input voltage Vin and supply it to the power control IC 30. The reference symbol RCS represents a current sense resistor to convert a current flowing through the switching circuit 10 at the primary coil into a voltage. The reference symbol RL represents an equivalent resistance such as circuits or ICs working as loads.

The switching circuit 10 comprises the N-channel MOSFETs M1, M2, M3, and M4 and the current sense resistor RCS. The N-channel MOSFETs M1, M2, M3, and M4 are serially connected between voltage input terminal VIN supplied with the DC voltage Vin such as 48 V and primary-side reference potential GND. The current sense resistor RCS is connected between a common source terminal for M2 and M4 of the switch MOSFETs M1 through M4 and reference potential GND. The switch MOSFETs M2 and M4 are located at the reference potential. Instead of the current sense resistor RCS, it may be preferable to use a current transformer to supply the power control IC 30 with a detected voltage in proportion to a current at the primary side.

The power control IC 30 comprises a PWM control circuit 31, a synchronous rectifier control circuit 32, a variable delay circuit 33, and a delay amount control circuit 34. The PWM control circuit 31 uses PWM (pulse width modulation) to control timings of the control signals OUT-A through OUT-D for the switches MOSFETs M1 through M4 from voltage Vsns detected by the sense resistor RCS and from output voltage Vout. The synchronous rectifier control circuit 32 controls timings to turn on or off the synchronous rectification MOSFETs M5 and M6 based on a signal from the PWM control circuit 31. The variable delay circuit 33 supplies proper delays to signals output from the PWM control circuit 31 and the synchronous rectifier control circuit 32 and outputs the delayed signals. The delay amount control circuit 34 determines a delay amount in the variable delay circuit 33 by using voltage Vin' proportional to the input voltage Vin divided by the divider resistors R11 and R12, the voltage Vsns detected by the sense resistor RCS, and setup values DLY1 through DLY3 from the outside.

Figure 2:
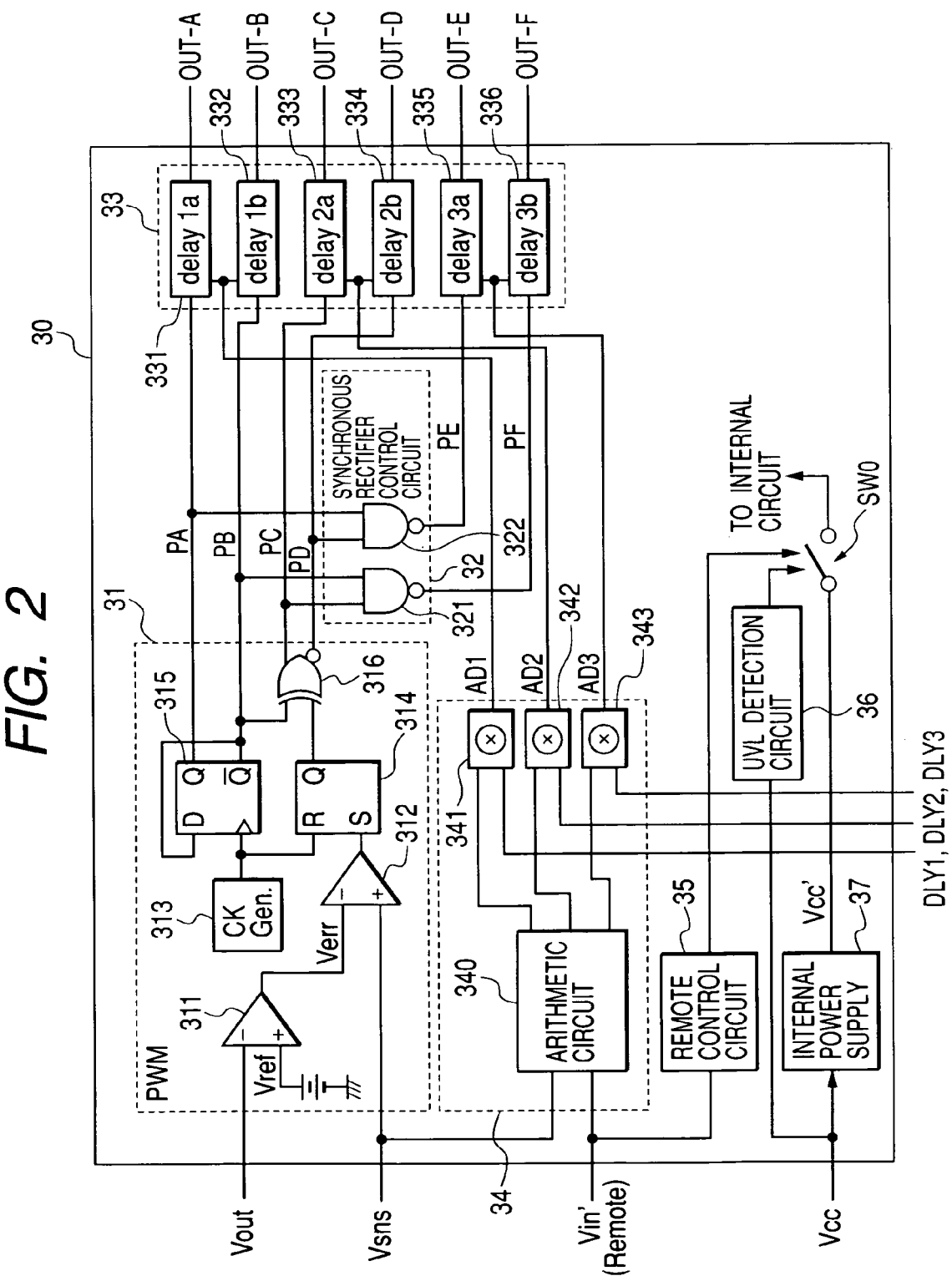
FIG. 2 is a block diagram showing a more specific configuration example of a power control IC 30 according to the embodiment.

FIG. 2 shows a more specific configuration example of the power control IC 30.

Figure 3:
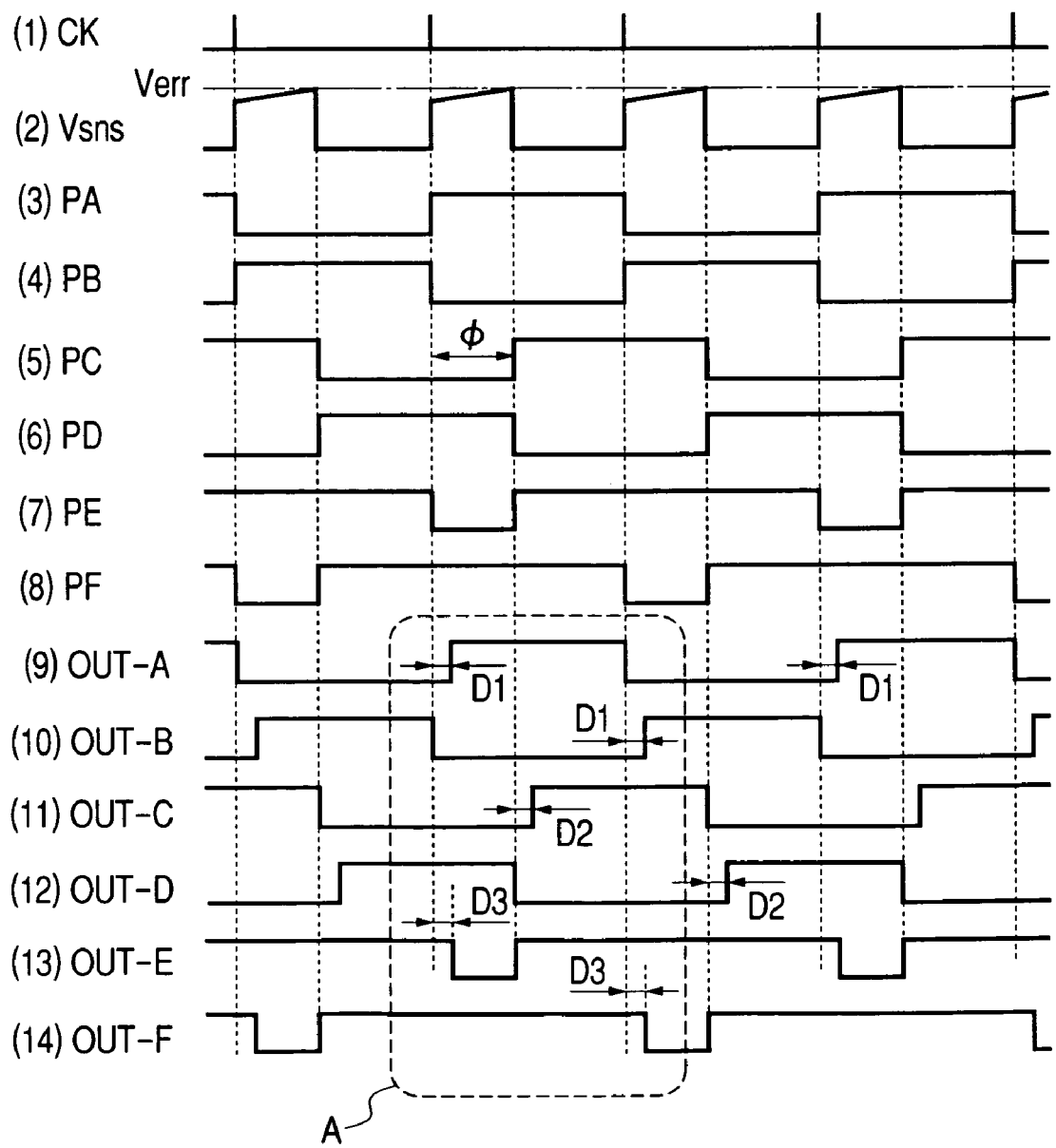
FIG. 3 is a timing chart showing timing of internal signals of the power control IC and signals output from the power control IC in the DC-DC converter according to the embodiment.

The PWM control circuit 31 mainly comprises an error amplifier 311, a comparator 312, a clock generator 313, an RS flip-flop 314, a D-type flip-flop 315, and a logic gate 316. The error amplifier 311 compares the output voltage Vout with reference voltage Vref and outputs voltage Verr corresponding to a potential difference. The comparator 312 compares the output voltage Verr from the error amplifier 311 with the voltage Vsns detected by the sense resistor RCS and determines which is larger. The clock generator contains an oscillator that provides a switching cycle for the switching circuit 10 at the primary side. The RS flip-flop 314 uses a clock signal generated by the clock generator 313 as a reset signal and uses an output signal from the comparator 312 as a set signal. The D-type flip-flop 315 divides the clock signal into halves. The logic gate 316 exclusive-OR's signal/Q divided by the flip-flop 315 with output Q from the flip-flop 314. Throughout this specification, the notation "signal/Q" represents a phase-inverted signal of signal Q. The PWM control circuit 31 generates and outputs complementary signals PA, PB, PC, and PD having phases shifted for φ from each other as indicated with (3) through (6) in FIG. 3.

According to the PWM control circuit 31, decreasing the output voltage Vout increases the Verr and φ and extends a period during which the primary coil supplied with current. By contrast, increasing the output voltage Vout decreases Verr and φ and shortens a period during which the primary coil supplied with current. The PWM control circuit 31 can provide control to keep the output voltage Vout constant even if the output current Iout varies with load fluctuations.

The synchronous rectifier control circuit 32 comprises NAND gates 322 and 321. The NAND gate 322 is supplied with signals PA and PD output from the PWM control circuit 31. The NAND gate 321 is supplied with signals PB and PC. The NAND gate 322 generates signal PE that turns off the synchronous rectification MOSFET M5 at the secondary side when the switches MOSFET M1 and M4 at the primary side are turned on. The NAND gate 321 generates signal PF that turns off the synchronous rectification MOSFET M6 when the switches MOSFET M2 and M3 at the primary side are turned on. In this manner, when the primary coil is supplied with current, either the synchronous rectification MOSFET M5 or M6 is sure to be turned off at the secondary side. It is possible to prevent the secondary coil from being short-circuited.

The variable delay circuit 33 comprises individual delay circuits 331 through 336. The individual delay circuits 331 through 334 delay signals PA through PD output from the PWM control circuit 31. The individual delay circuits 335 and 336 delay signals PE and PF output from the NAND gates 321 and 322. The delay amount control circuit 34 comprises an arithmetic circuit 340 and multiplication circuits 341 to 343. The arithmetic circuit 340 performs a specified operation using the voltage Vsns detected by the sense resistor RCS and using the voltage Vin' proportional to the input voltage Vin divided by the divider resistors R11 and R12. The multiplication circuits 341 to 343 multiply an operation result from the arithmetic circuit 340 by the setup values DLY1 through DLY3 from the outside to generate delay control signals AD1 through AD3.

The delay control signals AD1 through AD3 generated by the delay amount control circuit 34 determine delay amounts D1, D2, and D3 in the individual delay circuits 331 through 336. As indicated with (3) through (8) in FIG. 3, signals PA and PB are delayed by D1, PC and PD by D2, and PE and PF by D3 to generate signals as indicated with (9) through (14) in FIG. 3. The generated signals are output as the signals OUT-A through OUT-F that turn or off the switch MOSFETs M1 through M6. The delay control signals AD1 through AD3 may be voltage signals or current signals depending on forms of the delay circuits 331 through 336.

The DC-DC converter according to the embodiment provides control (ZVS) to turn on or off the switch MOSFETs M1 through M4 when their source-drain voltage Vds becomes 0 V. To do this, the PWM control circuit 31 generates a reference signal so as to turn on or off M1 and M2 in synchronization with clock CK and turn on or off M3 and M4 when the voltage Vsns detected by the sense resistor RCS reaches Verr. The variable delay circuit 33 supplies appropriate delays to these signals.

More specifically, the ZVS control is implemented as follows. The reference delay time for the variable delay circuit 33 is specified so that the switch MOSFETs M1 through M4 turn on when their source-drain voltage Vds becomes 0 V as a condition of the predetermined input voltage and load. Delay times are changed to shift on-timings for M1 through M4. That is to say, when the load deviates from a target value, the delay time is changed in accordance with the voltage Vsns detected by sense resistor RCS varying with the load. When the input voltage Vin changes, the delay time is changed in accordance with the voltage Vin' divided by the resistors.

The power control IC 30 according to the embodiment comprises a remote control circuit 35, a UVL detection circuit 36, an internal power circuit 37, and a power switch SW0. The remote control circuit 35 monitors the voltage Vin' proportional to the input voltage Vin divided by the divider resistors R11 and R12. The UVL detection circuit 36 monitors the power voltage Vcc from the auxiliary power supply 50. The internal power circuit 37 generates the internal power voltage Vcc' needed for the IC inside based on the power voltage Vcc. The power switch SW0 supplies or stops supplying internal circuits such as the PWM circuit 31 with the internal power voltage Vcc' generated by the internal power circuit 37. When the input voltage Vin or the power supply voltage Vcc goes below a specified level, the remote control circuit 35 or the UVL detection circuit 36 turns off the power switch SW0. In this manner, the power switch SW0 stops supplying the internal power supply voltage Vcc' to the PWM control circuit 31, the synchronous rectifier control circuit 32, the variable delay circuit 33, and the delay amount control circuit 34 for inactivating power supply operations.

According to the embodiment, a voltage monitor terminal for the remote control circuit 35 is also used as a terminal for supplying the voltage Vin' proportional to the input voltage Vin that is monitored by the delay amount control circuit 34 and is divided by the resistors. There is no need to add terminals. Further, as mentioned above, the embodiment does not monitor voltages at both terminals of the transformer's primary coil in order to detect the timing to zero reset the source-drain voltage Vds of the switch MOSFETs M1 through M4. Instead, an arithmetic operation is performed to indirectly find the timing to zero reset the source-drain voltage Vds for the switch MOSFETs M1 through M4 using the voltage detected by the current sense resistor RCS used for the PWM control and the voltage Vin' proportional to the input voltage Vin divided by the resistors. Also in this respect, it is possible to decrease terminals.

Further, it is possible to prevent an increase in the number of terminals for supplying the output current Iout. To do this, the monitor terminal (Vsns) of the output current Iout for PWM control is also used as the monitor terminal of the output current Iout for preventing overcurrent when there is provided an internal circuit for preventing an overcurrent from flowing into the secondary side. In the above-mentioned embodiment, the internal power circuit 37 generates the internal power supply voltage Vcc' based on the power supply voltage Vcc. When the power control IC 30 can withstand high voltages, it is also possible to generate the internal power supply voltage Vcc' based on the voltage Vin' proportional to the input voltage Vin divided by the resistors. In this case, the terminal to supply Vin' in FIG. 2 can be also used as the terminal to supply the power supply voltage Vcc. It is possible to further decrease external terminals.

Figure 4:
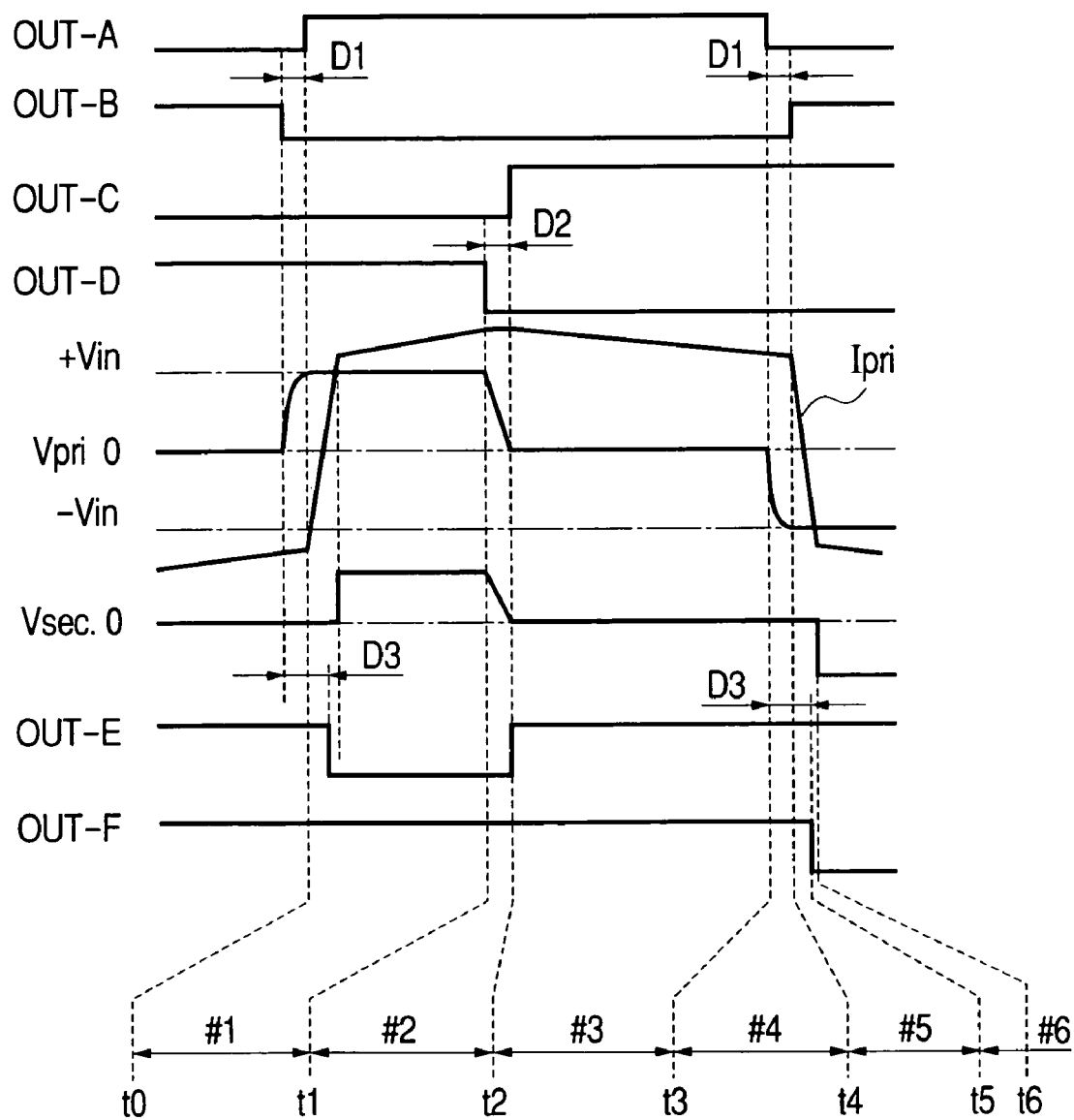
FIG. 4 is a timing chart showing details of the timing for the signals enclosed in a broken line A in FIG. 3.

The following describes operations of the DC-DC converter according to the embodiment with reference to the timing chart in FIG. 4 and the equivalent circuit diagrams in FIGS. 5 through 10. FIG. 4 shows an enlargement of the portion enclosed in the broken line A in FIG. 3. FIGS. 5 through 10 show states of the switching circuit 10 and the synchronous rectifier circuit 20 during the periods #1 through #6 in FIG. 4.

In FIGS. 5 through 10, switches indicated by the reference symbols SA through SF are equivalent to the MOSFETs M1 through M6 in FIG. 1. The reference symbol Cr represents a capacity parasitic on each switch MOSFET. The reference symbol Lr represents a leak inductance of the transformer TS1 or a parasitic inductance component of wirings. The reference symbols V11 and V12 represent terminal voltages on the primary coil.

Figure 5:
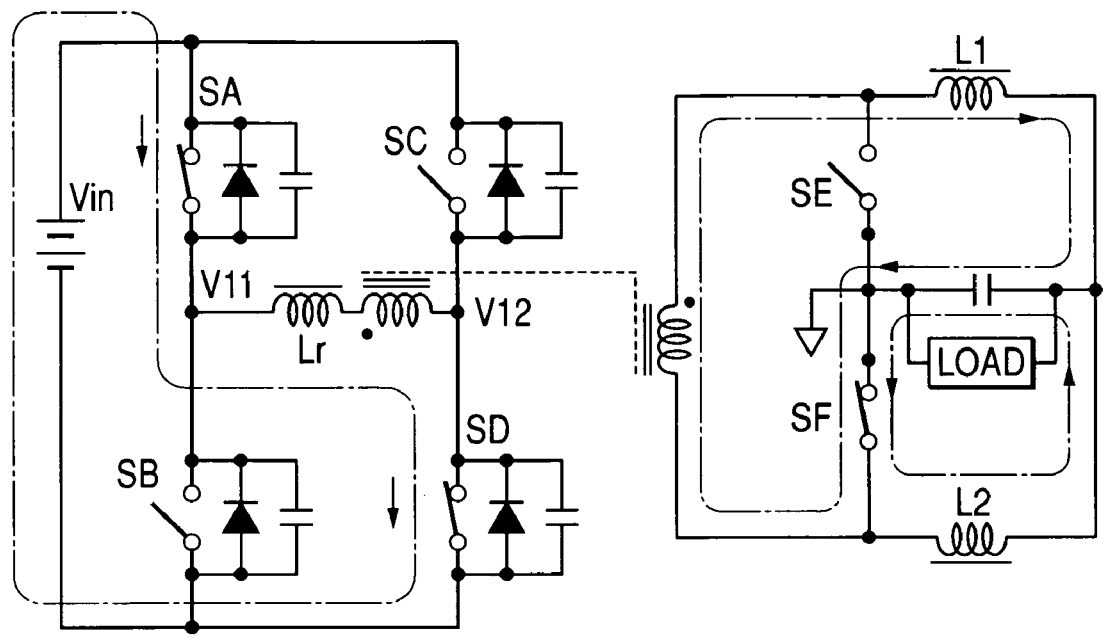
FIG. 5 is an equivalent circuit diagram showing states and a current flow of switch MOSFETs constituting the DC-DC converter according to the embodiment for period #1 in FIG. 4.

During the period #1, the switches SA and SD turn on and the switches SB and SC turn off in the switching circuit at the primary side as shown in FIG. 5. At this time, the synchronous rectification switch SE turns off and the synchronous rectification switch SF turns on in the rectifier circuit at the secondary side. In this manner, the input voltage Vin is applied to the primary coil of the transformer TS1 to let an electric current flow through the coil. The secondary coil of the transformer TS1 induces a voltage in proportion to turn ratio N to transmit power from the primary side to the secondary side. Since SE turns off and SF turns on in the rectifier circuit at the secondary side, a current flows from the choke coil L1 to the load RL, and then to the switch SF to store energy in L1.

Figure 6:
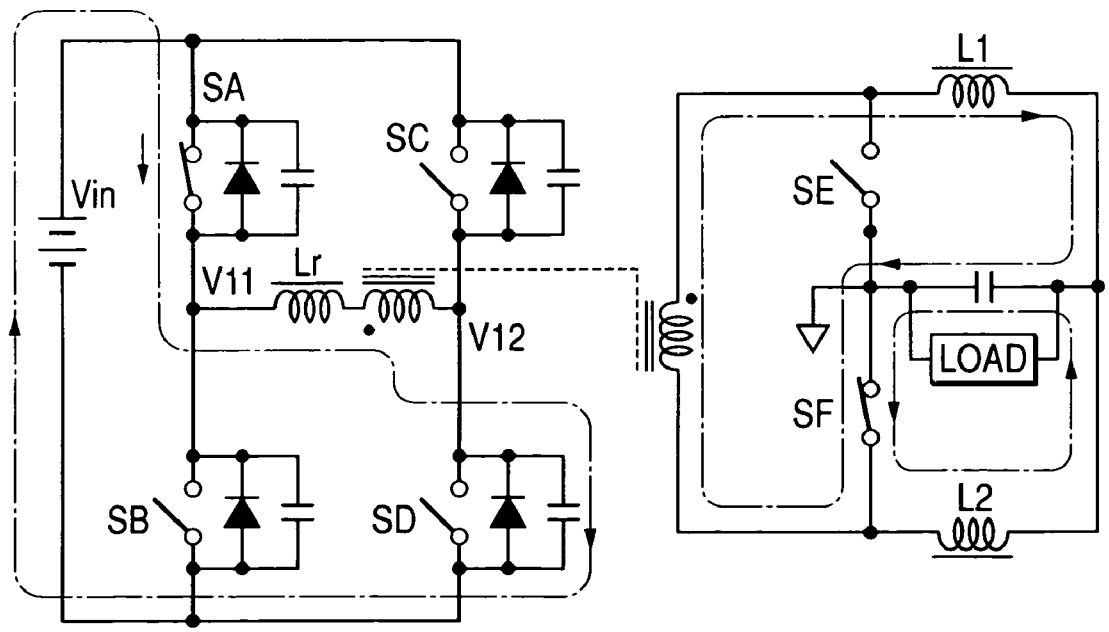
FIG. 6 is an equivalent circuit diagram showing states and a current flow of switch MOSFETs constituting the DC-DC converter according to the embodiment for period #2 in FIG. 4.

During the period #2, the switch SA turns on and the switches SD, SB, and SC turn off in the switching circuit at the primary side as shown in FIG. 6. Like the period #1, the rectifier circuit at the secondary side keeps the synchronous rectification switch SE to be off and SF to be on. Even if SD turns off at the primary side, the current continues to flow into the primary coil of the transformer TS1. Consequently, the current of the primary coil flows toward the parasitic capacitor Cr that charges the current, increasing the terminal voltage V12 of the coil.

There is a time interval during which the terminal voltage V12 of the primary coil increases and reaches Vin, i.e., the voltage between the primary coil terminals changes from Vin to 0 V. the time interval is expressed as t2−t1 by the following equation (1).

$$t2-t1=(Cr \times Vin \times N)/(0.5 \times Iout) \qquad (1)$$

In equation (1), Iout is multiplied by 0.5 for the following reason. A current flowing per cycle becomes a half of Iout in a current doubler circuit configured by providing two choke coils L1 and L2 for the synchronous rectifier circuit like the embodiment. Equation (1) makes the following clear. If the switch SD is turned off and then the switch SC is turned on after the time interval (t2−t1), it is possible to turn on SC when the source-drain voltage becomes 0 V.

According to the embodiment, the arithmetic circuit 340 of the delay amount control circuit 34 performs the operation of equation (1) to determine a delay time D2 (=t2−t1) for activating the control signal OUT-C of the switch SC. This can minimize switching losses of the switch SC.

Figure 7:
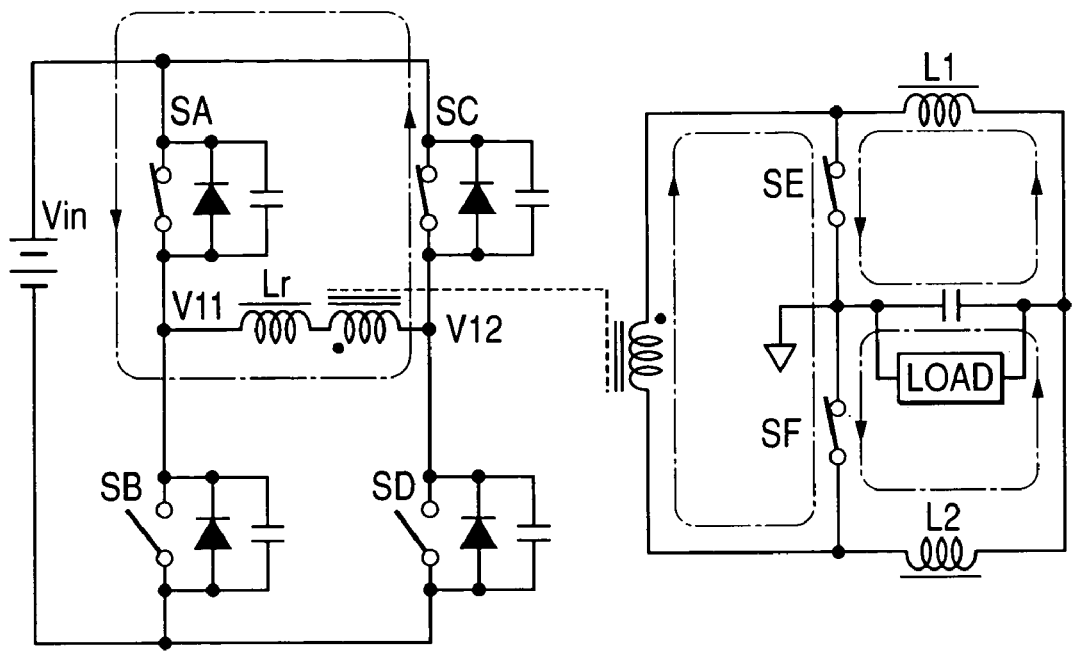
FIG. 7 is an equivalent circuit diagram showing states and a current flow of switch MOSFETs constituting the DC-DC converter according to the embodiment for period #3 in FIG. 4.

During the period #3, the switches SA and SC turn on and the switches SD and SB turn off in the switching circuit at the primary side as shown in FIG. 7. At this time, the synchronous rectification switches SE and SF turn on in the rectifier circuit at the secondary side. As a result, the primary and secondary coils of the transformer TS1 are short-circuited and become idle to let the current flow continuously. On the circuit at the secondary side, the energy stored in the choke coils L1 and L2 is radiated and is consumed by the load RL.

Figure 8:
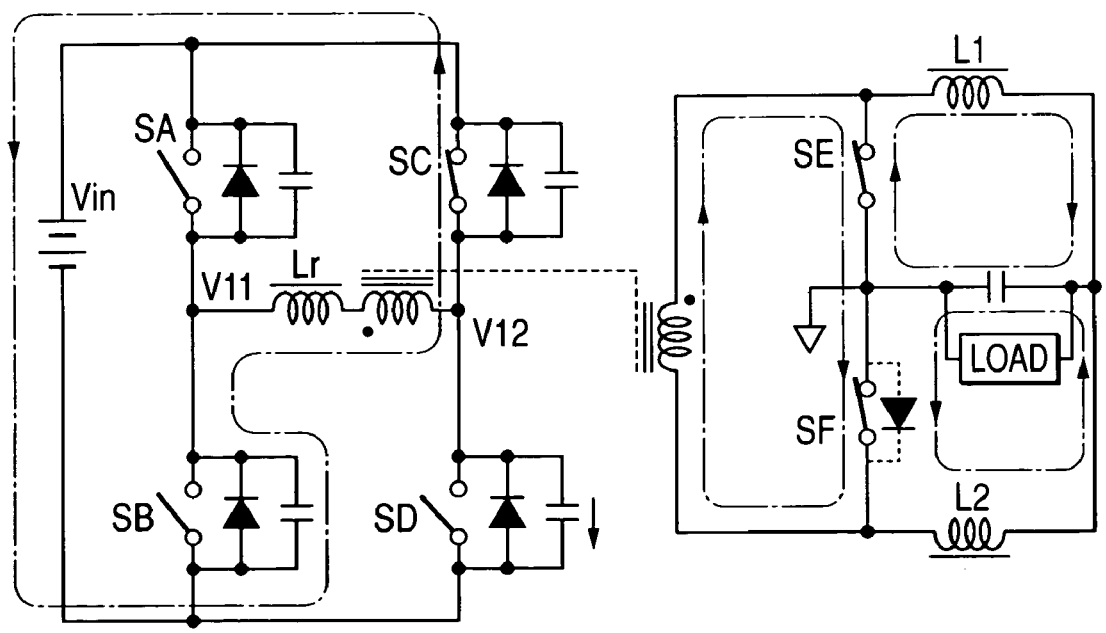
FIG. 8 is an equivalent circuit diagram showing states and a current flow of switch MOSFETs constituting the DC-DC converter according to the embodiment for period #4 in FIG. 4.

During the period #4, the switches SA, SB, and SD turn off and the switch SC turns on in the switching circuit at the primary side as shown in FIG. 8. Like the period #3, the rectifier circuit at the secondary side keeps the synchronous rectification switches SE and SF to be on.

The switching circuit at the primary side then discharges the electric charge stored in the parasitic capacitor of the switch SB to rapidly decrease the terminal voltage V11 of the coil. At this time, the parasitic capacitor of the switch SB and the parasitic inductance Lr of the primary coil configure a series resonance circuit. Consequently, the terminal voltage V11 of the coil drops sinusoidally.

When the series resonance circuit comprising Cr and Lr contains a smaller resonance peak voltage (absolute value) than the input voltage Vin, the following equation (2) is used to express time t4−t3 during which the voltage Vin reaches the peak value (minimum value).

$$t4-t3=\{2\pi \times \sqrt{(Lr \times Cr)}\}/4 \quad (2)$$

The resonance peak voltage Vpp is expressed by the following equation (3).

$$Vpp=(Iout/2)/N \times \{\sqrt{(Lr/Cr)}\} \quad (3)$$

Equation (2) makes the following clear. If the switch SA is turned off and then the switch SB is turned on after the time interval (t4−t3), it is possible to turn on SB when its source-drain voltage becomes 0 V.

According to the embodiment, the arithmetic circuit 340 of the delay amount control circuit 34 performs the operation of equation (2) to determine a delay time D1 (=t4−t3) for activating the control signal OUT-B of the switch SB. If the switch SB turns on before the terminal voltage V11 of the primary coil reaches the peak value (minimum value), the switch SB is subject to a loss because the switch SB turns on before the source-drain voltage reaches 0 V. According to the embodiment, the switch SA turns off and then the switch SB turns on after the delay D1 (timing t4 in FIG. 4), i.e., at the timing when the SB's source-drain voltage becomes 0 V. For this reason, it is possible to minimize switching losses of the switch SB.

Figure 9:
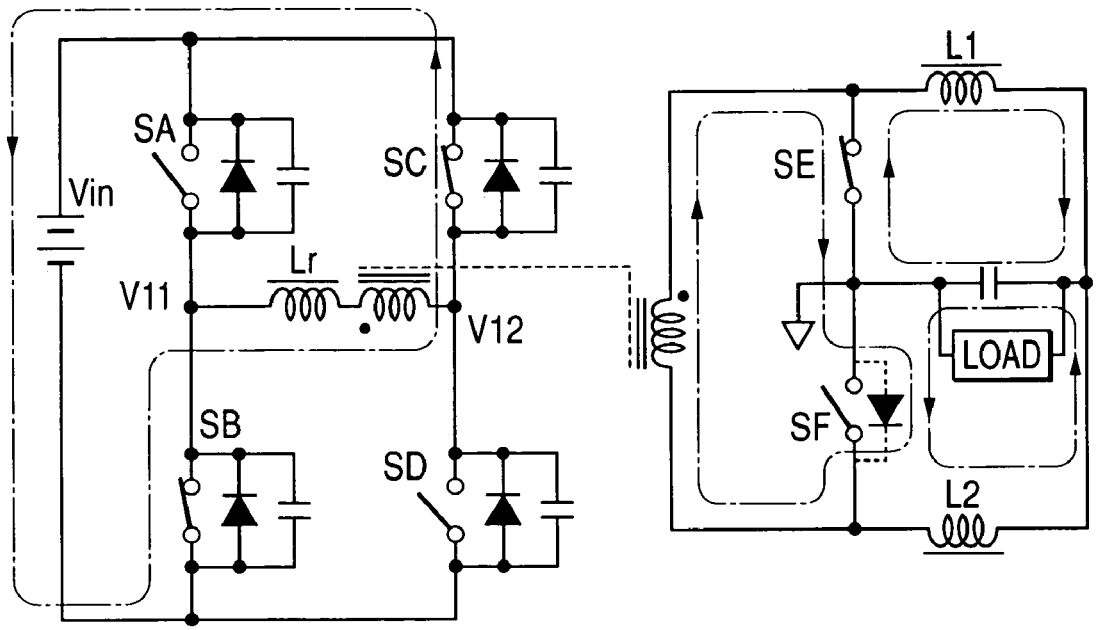
FIG. 9 is an equivalent circuit diagram showing states and a current flow of switch MOSFETs constituting the DC-DC converter according to the embodiment for period #5 in FIG. 4.
Figure 10:
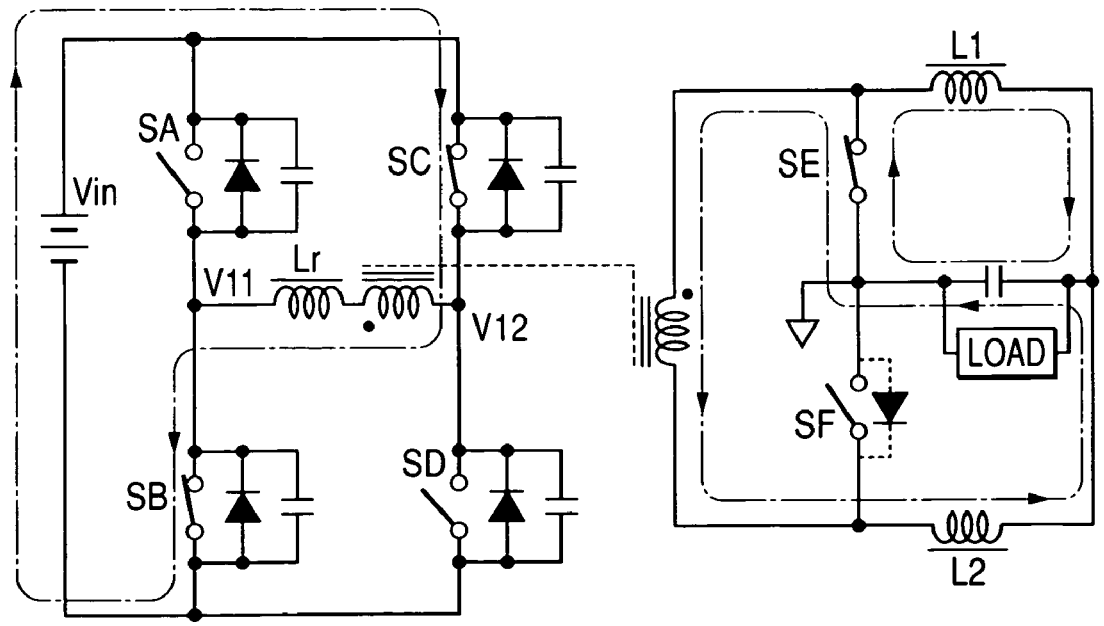
FIG. 10 is an equivalent circuit diagram showing states and a current flow of switch MOSFETs constituting the DC-DC converter according to the embodiment for period #6 in FIG. 4.

During the period #5, the switches SB and SC turn off and the switches SA and SD turn on in the switching circuit at the primary side as shown in FIG. 9. This inverts the direction of current flowing through the primary and secondary coils of the transformer. However, the current direction does not invert yet immediately after the switch SB turns on. If the switch SF at the secondary side turns off, a loss occurs in the SF's body diode. If a delay occurs in the timing to turn off the switch SF, the secondary coil is short-circuited even if the primary coil is activated. Accordingly, it is most desirable to turn off the switch SF at the timing t5 immediately before the timing t6 that inverts the direction of the current flowing through the coil.

Here, the following equation (4) can be used to express a time interval t6−t4 needed to turn on the switches SB and SC and then invert the current direction.

$$t6-t4=(Lr \times Iout/2)/(N \times Vin) \quad (4)$$

According to the embodiment, the arithmetic circuit 340 of the delay amount control circuit 34 performs the operation of equation (4) to determine a delay time D3 {=(t5−t4)<(t6−t4)} for inactivating the control signal OUT-F of the switch SF. Accordingly, it is possible to minimize switching losses of the switch SF. During the period #6 after the switch SF turns off, the input voltage −Vin is applied to the primary coil of the transformer TS1. The primary coil is supplied with a current having the direction reverse to that in FIG. 5. The power is transmitted from the primary side to the secondary side. Since SE turns on and SF turns off in the rectifier circuit at the secondary side, the current flows from the choke coil L2 to the load RL and then to the switch SE to store energy in L2.

Thereafter, control is provided according to the procedure similar to that described with reference to FIGS. 6 through 9, making it possible to operate the DC-DC converter with minimum losses. Therefore, it is possible to provide the power supply device having the sufficient current supply capability by increasing switching frequencies despite the use of smaller coils or capacitors than those used for the prior art. Since there is no need to provide a special heat dissipation structure because of small losses, miniaturizing coils or capacitors can also miniaturize the device.

Figure 11I:
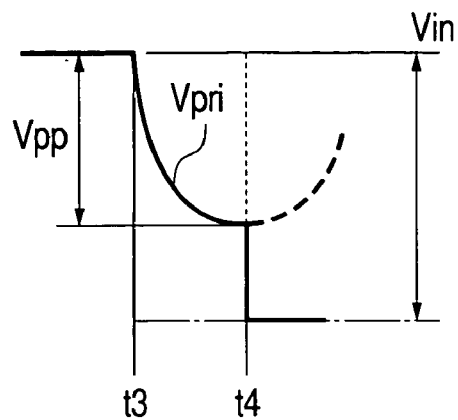
FIG. 11 shows waveforms indicating changes of voltage Vpri between terminals at the primary coil during period #4 in FIG. 4 depending on magnitude relationship between resonance peak voltage Vpp and input voltage Vin.
Figure 11:
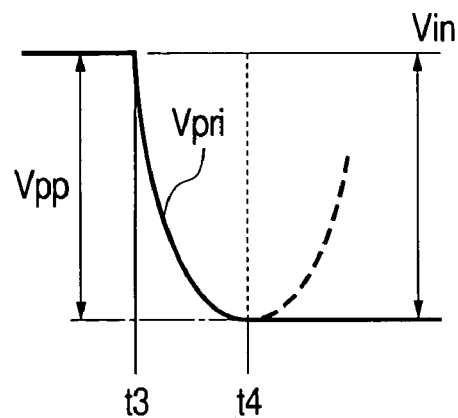

The above-mentioned embodiment has described how to determine the timing to turn on the switch SB by assuming the case where the resonance peak voltage (absolute value) Vpp of the series resonance circuit comprising Cr and Lr is smaller than the input voltage Vin. However, the above-mentioned conditions are not necessarily satisfied if power supply's operating conditions change. According to the relationship between the resonance peak voltage Vpp and the input voltage Vin, there are three operation waveforms (i) through (iii) as shown in FIG. 11 for the voltage Vpri between both terminals of the primary coil during the period #4. In any conditions, as expressed by equation (2), the same time interval (t4−t3) is needed for the voltage Vpri between both terminals to reach the resonance peak voltage. However, a loss may occur if the switch SB turns on at the time when the voltage Vpri between both terminals of the primary coil reaches the resonance peak voltage.

i) Vpp<Vin (FIG. 11 (i))

Under this condition, the resonance peak voltage Vpp is smaller than Vin. The voltage Vpri between both terminals does not reach Vin. A loss occurs even if the switch SB turns on when the voltage Vpri between both terminals reaches the resonance peak voltage. In order to minimize losses, it is optimal to turn on the switch SB at the timing t4 to reach the peak voltage, i.e., at the timing when the drain-source voltage of the switch SB becomes minimum.

ii) Vpp=Vin (FIG. 11 (ii))

Under this condition, it is possible to minimize losses by turning on the switch SB at the timing t4 when the voltage Vpri between both terminals reaches the peak voltage.

iii) Vpp>Vin (FIG. 11 (iii))

Under this condition, a resonance voltage reaches Vin at timing t4' earlier than the timing t4 when the voltage Vpri between both terminals reaches the peak voltage. Since the voltage Vpri between both coil terminals is clamped to Vin, the resonance waveform does not become a sinusoidal wave as indicated by the broken line. Thus, no peak appears. In this case, turning on the switch SB at the timing t4 can implement the ZVS control that changes the switch state at the timing to zero the drain-source voltage. However, a current flows into the body diode of the switch SB between t4' and t4, causing a loss. In this case, it is proper to turn on the switch SB at the timing t4'.

The following equation (5) can be used to express a time interval (t4'−t3) during which the voltage Vpri between both coil terminals reaches Vin.

$$t4'-t3=\{\sqrt{(Lr \times Cr)}\} \times \mathrm{Sin}^{-1}[(Vin \times 2N)/Iout/\{\sqrt{(Lr/Cr)}\}] \quad (5)$$

It can be understood that the relationship is a function between Vin and Iout. Consequently, it is possible to minimize losses by setting the time interval as expressed by equation (2) or (5) in accordance with the relationship between Vin and Vpp.

However, the scale of the control circuit increases in an attempt to provide control depending on the individual conditions as mentioned above or according to the complicated arithmetic operation as represented by equation (5). To solve this problem, a possible solution is to permanently set D1 to the delay time expressed by equation (2) at the sacrifice of some losses. In this case, the condition i) cannot implement the ZVS control but enables the control at minimum losses. The condition ii) can implement the ZVS control and provide the control at minimum losses. The condition iii) can implement the ZVS control but causes a continuity loss in the body diode.

Another possible method is to add resonance inductance Lr and resonance capacitor Cr under operating conditions of the power supply and within the range of input voltages or load currents so that the resonance peak voltage always becomes Vin or higher. That is to say, the method is to always ensure the state (iii) in FIG. 11 independently of operating conditions of the power supply. In this case, the resonance peak voltage Vpp is expressed by equation (3). The state (iii) in FIG. 11 can be always ensured by adding Lr and Cr satisfying the following equation (6).

$$Vin\_max < (Iout\_min/2)/N \times \{\sqrt{(Lr \times Cr)}\} \qquad (6)$$

When X<0.7, it is possible to approximate as $\sin^{-1} X \approx X$. the resonance inductance Lr and the resonance capacitor Cr are added so as to satisfy the following equation (7).

$$Vin\_max/0.7 < (Iout\_min/2)/NX\{\sqrt{(Lr \times Cr)}\} \qquad (7)$$

In this case, the delay time D3 (=t4'−t3) can be found by the following equation (8).

$$t4'-t3 = (Vin \times N)/\{Ioutx\sqrt{(Lr/Cr)}\} \qquad (8)$$

It should be noted that the above-mentioned control methods are examples. The present invention is not limited thereto because it adjusts delay times in accordance with the input voltage Vin and the current Iout of the power supply.

Figure 12:
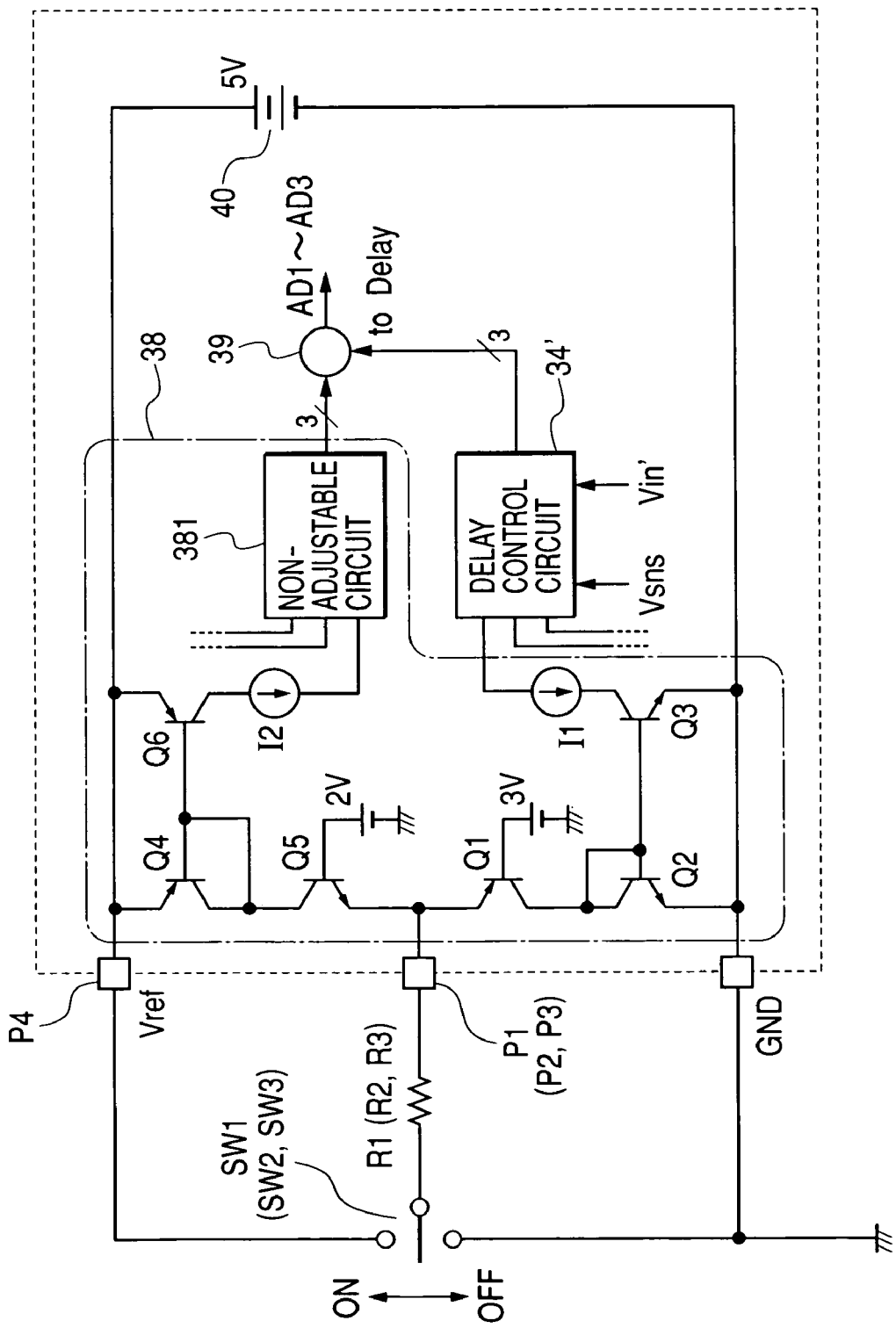
FIG. 12 is a schematic configuration diagram showing a first modification of the power control IC constituting the DC-DC converter according to the first embodiment.

FIG. 12 shows a first modification of the embodiment in FIG. 1. The modification provides an auxiliary function circuit 38 and a synthesis circuit 39. The auxiliary function circuit 38 provides a function that allows a user to freely determine whether or not to use the timing adjustment function according to the present invention. The synthesis circuit 39 synthesizes an output signal from the auxiliary function circuit 38 with an output signal from a delay amount control circuit 34' having the function equivalent to that of the delay amount control circuit 34 in FIG. 2, and then outputs a synthesized signal.

Further, the modification is configured to be able to inactivate the timing adjustment function by using the external terminals for supplying the setup values DLY1 through DLY3 to specify the delay amount as shown in FIG. 2. FIG. 12 shows one of the external terminals (e.g., DLY1) for supplying the setup values DLY1 through DLY3 to specify the delay amount and an accompanying circuit. Though not shown, the same accompanying circuit is provided to the remaining two terminals DLY2 and DLY3.

The auxiliary function circuit 38 in FIG. 12 comprises PNP transistors Q1 and Q4, NPN transistors Q2 and Q5, transistors Q3 and Q6, power supply sources I1 and I2, and a non-adjustable circuit 381. The PNP transistor Q1 and the NPN transistor Q2 are serially connected between the terminal P1 (P2 or P3) supplied with the setup value DLY1 (DLY2 or DLY3) and the power supply terminal (ground terminal) GND supplying a ground potential. The transistor Q3 is connected to the transistor Q2 in a current mirror fashion. The power supply source I1 is connected to the emitter of the transistor Q3. The PNP transistor Q4 and the NPN transistor Q5 are serially connected between a terminal P4 to externally output the reference voltage Vref generated by an internal constant voltage circuit 40 and the terminal P1 (P2 or P3) supplied with the setup value DLY1 (DLY2 or DLY3). The transistor Q6 is connected to the transistor Q5 in a current mirror fashion. The power supply source I2 is connected to the emitter of the transistor Q6. The non-adjustable circuit 381 operates on a current from the power supply source I2 and supplies a delay control signal to generate specified delays predetermined in the delay means 331 through 336 of the variable delay circuit 33.

The delay amount control circuit 34' is configured to operate on a current from the power supply source I1 and change an output signal according to its current value. The synthesis circuit 39 synthesizes a signal output from the delay amount control circuit 34' with a signal output from the non-adjustable circuit 381. The synthesized signals are supplied as the delay control signals AD1 through AD3 to the variable delay circuit 33. Further, the external terminals P1 through P3 are respectively provided with switches SW1 through SW3 to selectively connect the other terminals of the external resistors R1 through R3 with the ground potential or the reference voltage output terminal P4.

According to the embodiment, the transistors Q1 and Q2 turn off when the switches SW1 through SW3 are set to the ground potential GND. The delay amount control circuit 34 is supplied with no current from the power supply source I1 and becomes inactive. On the other hand, the transistors Q4 and Q5 turn on to supply a current to the non-adjustable circuit 381 from the power supply source I2. The non-adjustable circuit 381 becomes active and outputs a specified signal.

The transistors Q4 and Q5 turn off when the switches SW1 through SW3 are set to the reference voltage output terminal P4. The non-adjustable circuit 381 is supplied with no current from the power supply source I2 and becomes inactive. On the other hand, the transistors Q1 and Q2 turn on to supply a current to the delay amount control circuit 34 from the power supply source I1. In this manner, the delay amount control circuit 34 generates a delay control signal for the variable delay circuit 34. Further, according to the embodiment, when the switches SW1 through SW3 are set to the reference voltage output terminal P4, the variable delay circuit 34 outputs signals corresponding to resistance values of the resistors R1 through R3 at that time.

The switches SW1 through SW3 need not be provided as elements. For example, it may be preferable to select connection destinations of the resistors R1 through R3 by changing the wiring pattern formed on the printed circuit board where the power control IC 30 is mounted. In FIG. 12, the resistors R1 through R3 are respectively provided between the external terminals P1 through P3 and the switches SW1 through SW3. Further, it may be preferable to provide resistors having specified resistance values between the transistor Q5 and the external terminals P1 through P3 in the chip and connect the resistors R1 through R3 between the reference voltage output terminal P4 and the switches SW1 through SW3. In this manner, the R1 through R3 can be eliminated when the external terminals P1 through P3 are connected to the ground potential to inactivate the delay amount control circuit 34. In addition, there is no such problem in the embodiment that currents from the power supply source I2 depend on resistance values of the resistors R1 through R3.

Figure 13:
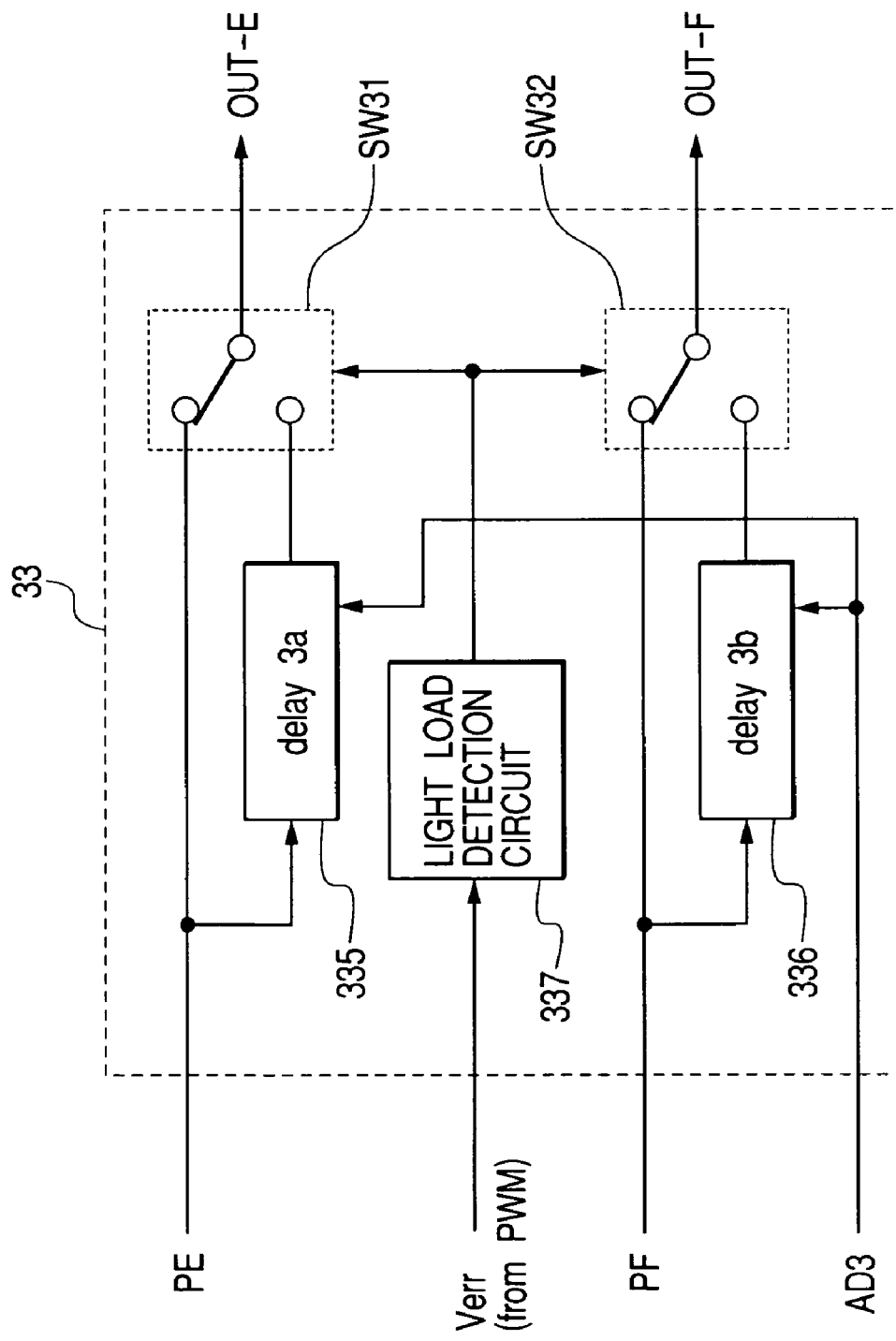
FIG. 13 is a schematic configuration diagram showing a second modification of the power control IC constituting the DC-DC converter according to the first embodiment.

FIG. 13 shows a second modification of the embodiment in FIG. 1.

This modification turns off the switch MOSFETs M5 and M6 of the synchronous rectifier circuit 20 at different timings depending on a light load and a normal load. Specifically, the variable delay circuit 33 includes bypass paths, selection switches SW31 and SW32, and a light load detection circuit 337. The bypass paths are used to allow the timing signals PE and PF from the synchronous rectifier control circuit 32 to bypass the individual delay circuits 335 and 336. The selection switches SW31 and SW32 determine which of the timing signals PE and PF passing through the bypass paths or timing signals PE' and PF' delayed by the individual delay circuit 335 and 336 should be output as synchronous rectifier signals OUT-E and OUT-F. When the output Verr from the error amplifier 311 in the PWM control circuit 31 goes below a specified level, the light load detection circuit 337 determines a light load and generates a control signal that changes the selection switches SW31 and SW32 to the bypass paths.

Figure 14:
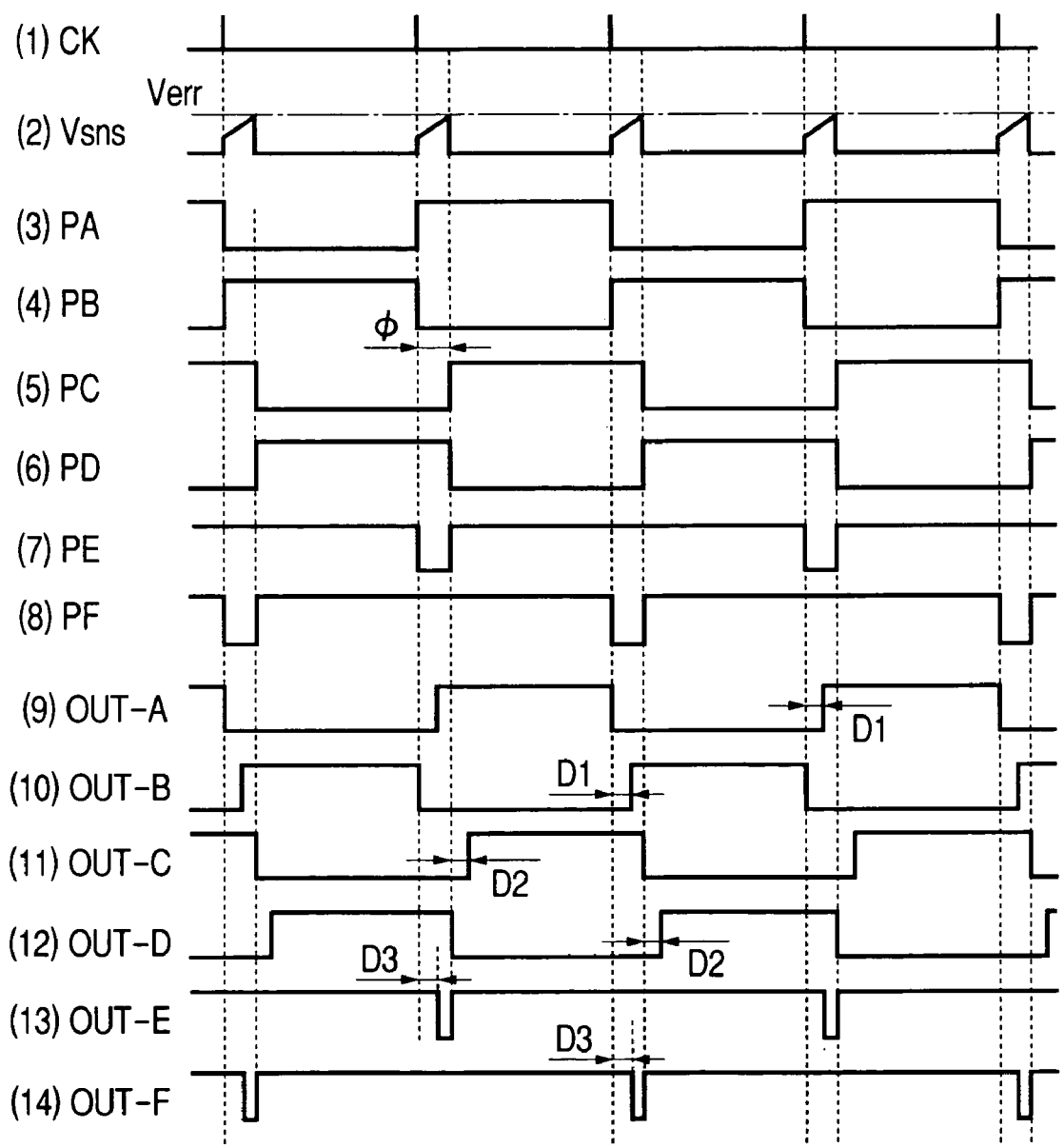
FIG. 14 is a timing chart showing timing of internal signals of the power control IC and signals output from the power control IC according to the second modification.

Operations during the light load will now be described. FIG. 14 shows signal waveforms of the control circuit during the light load. During the light load, an output voltage from the error amplifier 311 drops. The PWM control circuit 31 changes timings of the control signals OUT-A, OUT-B, OUT-C, and OUT-D so as to decrease the output power. This shortens a period for transmitting the power from the primary side to the secondary side i.e., a period during which OUT-A and OUT-D or OUT-B and OUT-C simultaneously go to the high level. However, the phase shift control according to the embodiment constantly provides a duty ratio of approximately 50% for the control signals OUT-A through OUT-D at the primary side. During the light load, phase difference Φ in FIG. 14 becomes small. On the other hand, the secondary side provides a narrow pulse width for the synchronous rectifier control signals OUT-E and OUT-F.

In this state, controlling the delay time D3 causes the pulse width to be too narrow. A switch element to be controlled may not turn off completely. In the worst case, the transformer at the secondary side may be short-circuited to destroy elements. In order to avoid the problem of causing a short-circuiting state, the modification forcibly sets the delay time D3 to "0" for the synchronous rectifier control signals OUT-E and OUT-F during the light load. Setting D3 to "0" is equivalent to outputting the timing signals PE and PF from the synchronous rectifier control circuit 32 unchangedly as synchronous rectifier signals OUT-E and OUT-F, respectively. The light load detection circuit 337 in FIG. 13 can comprise a comparator and may be provided in the PWM control circuit 31 rather than in the variable delay circuit 33.

Figure 15:
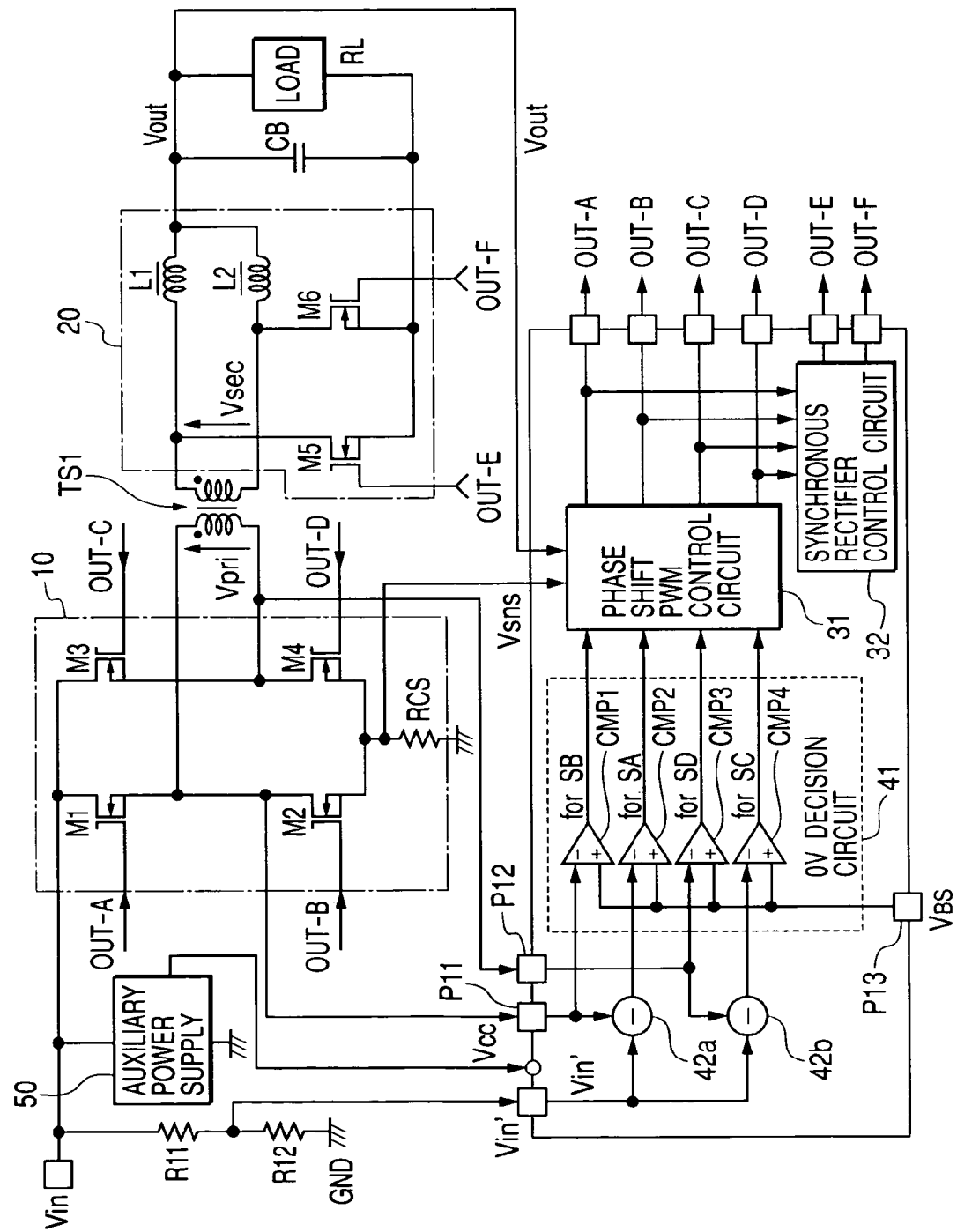
FIG. 15 is a schematic configuration diagram showing a second embodiment of the DC-DC converter according to the present invention.

The following describes a second embodiment of the DC-DC converter according to the present invention with reference to FIG. 15. The mutually corresponding elements and circuits in FIGS. 15 and 1 are designated by the same reference numerals and a duplicate description is omitted for simplicity.

Instead of the delay amount control circuit 34 in the previous embodiment, the embodiment in FIG. 15 provides input terminals P11 and P12, a 0 V decision circuit 41, an external terminal P13, and difference circuits 42a and 42b. The input terminal P11 and P12 monitor the terminal voltages V11 and V12 of the primary coil in the switching circuit 10. The 0 V decision circuit 41 comprises comparators CMP1 through CMP4. The external terminal P13 supplies voltage VBS used as a criterion. The difference circuits 42a and 42b generate differences between the voltage Vin' proportional to the input voltage Vin divided by the resistors R11 and R12 and the coil's terminal voltages V11 and V12, respectively.

According to the embodiment, the PWM control circuit 31 generates the control signals OUT-A through OUT-D for the switch MOSFETs M1 through M4 in the switching circuit 10 based on a determination result from the 0 V decision circuit 41. The comparators CMP1 through CMP4 of the 0 V decision circuit 41 are supplied with the coil's terminal voltages V11 and V12 or output potentials from the difference circuits 42a and 42b. When these potentials exceed the criterion voltage VBS, a low-level signal is output. When these potentials go below the criterion voltage VBS, a high-level signal is output.

More specifically, the comparator CMP1 outputs a low-level signal when one of the coil terminal voltages, i.e., V11 becomes higher than the criterion voltage VBS. The comparator CMP1 outputs a high-level signal when the terminal voltage V11 becomes lower than the criterion voltage VBS, i.e., when the source-drain voltage Vds of the switch MOSFET M2 becomes lower than the criterion voltage VBS. The comparator CMP3 outputs a low-level signal when the other coil terminal voltage, i.e., V12 becomes higher than the criterion voltage VBS. The comparator CMP3 outputs a high-level signal when the terminal voltage V12 becomes lower than the criterion voltage VBS, i.e., when the source-drain voltage Vds of the switch MOSFET M4 becomes lower than the criterion voltage VBS.

The comparator CMP2 outputs a low-level signal when a potential difference between one of the coil terminal voltages, i.e., V11 and the voltage Vin' is higher than the criterion voltage VBS. The comparator CMP2 outputs a high-level signal when the potential difference becomes lower than the criterion voltage VBS, i.e., when the source-drain voltage Vds of the switch MOSFET M1 becomes lower than the criterion voltage VBS. The comparator CMP4 outputs a low-level signal when a potential difference between the other coil terminal voltage, i.e., V12 and the voltage Vin' is higher than the criterion voltage VBS. The comparator CMP4 outputs a high-level signal when the potential difference becomes lower than the criterion voltage VBS, i.e., when the source-drain voltage Vds of the switch MOSFET M3 becomes lower than the criterion voltage VBS. Here, it should be noted that the voltage Vin' is proportional to the input voltage Vin divided by the resistors.

Figure 16:
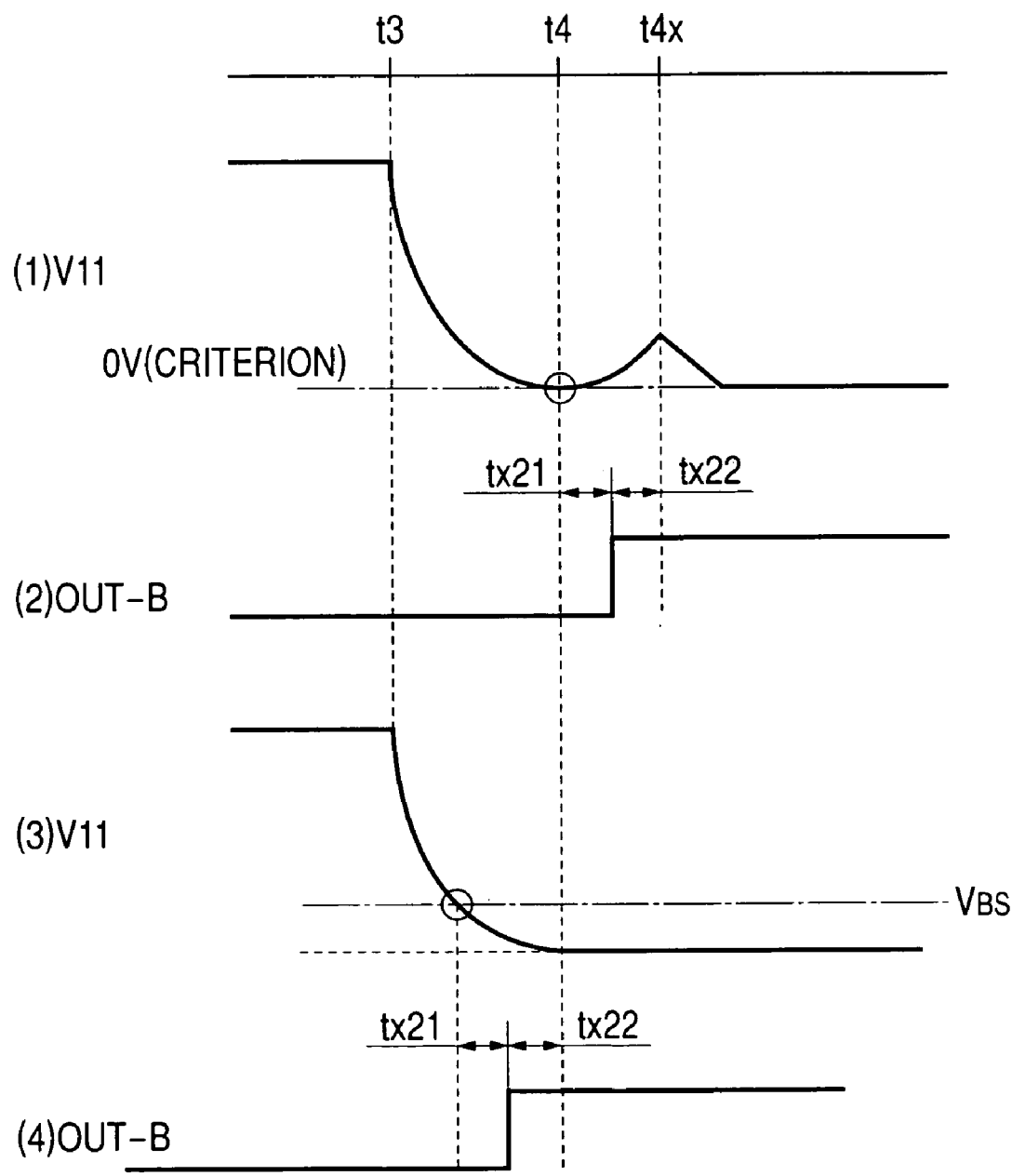
FIG. 16 is a timing chart showing terminal voltages at the primary coil and timing of switch control signals when the second embodiment is applied and when it is not.
Figure 17:
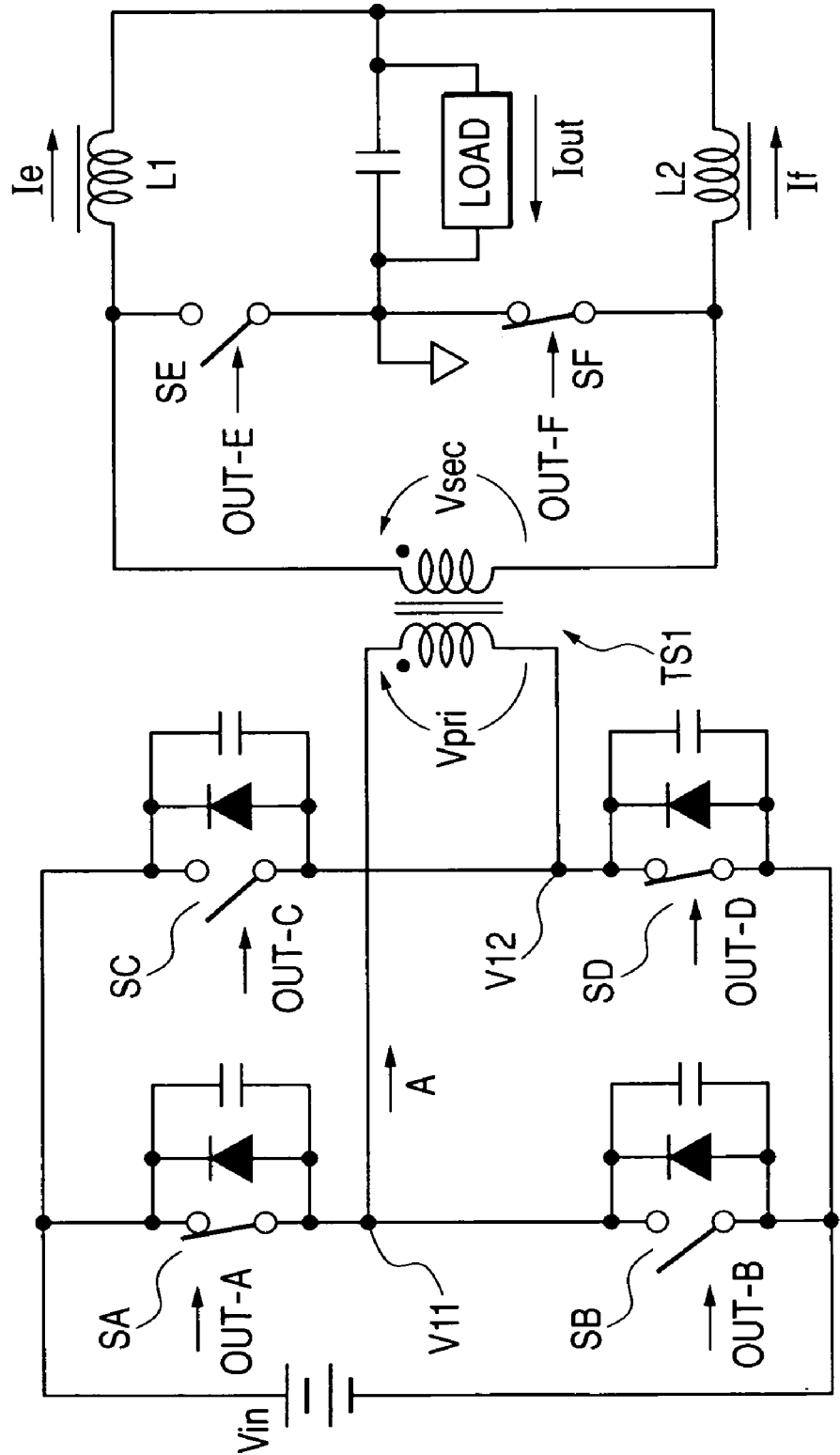
FIG. 17 is an equivalent circuit diagram exemplifying a conventional DC-DC converter.
Figure 18:
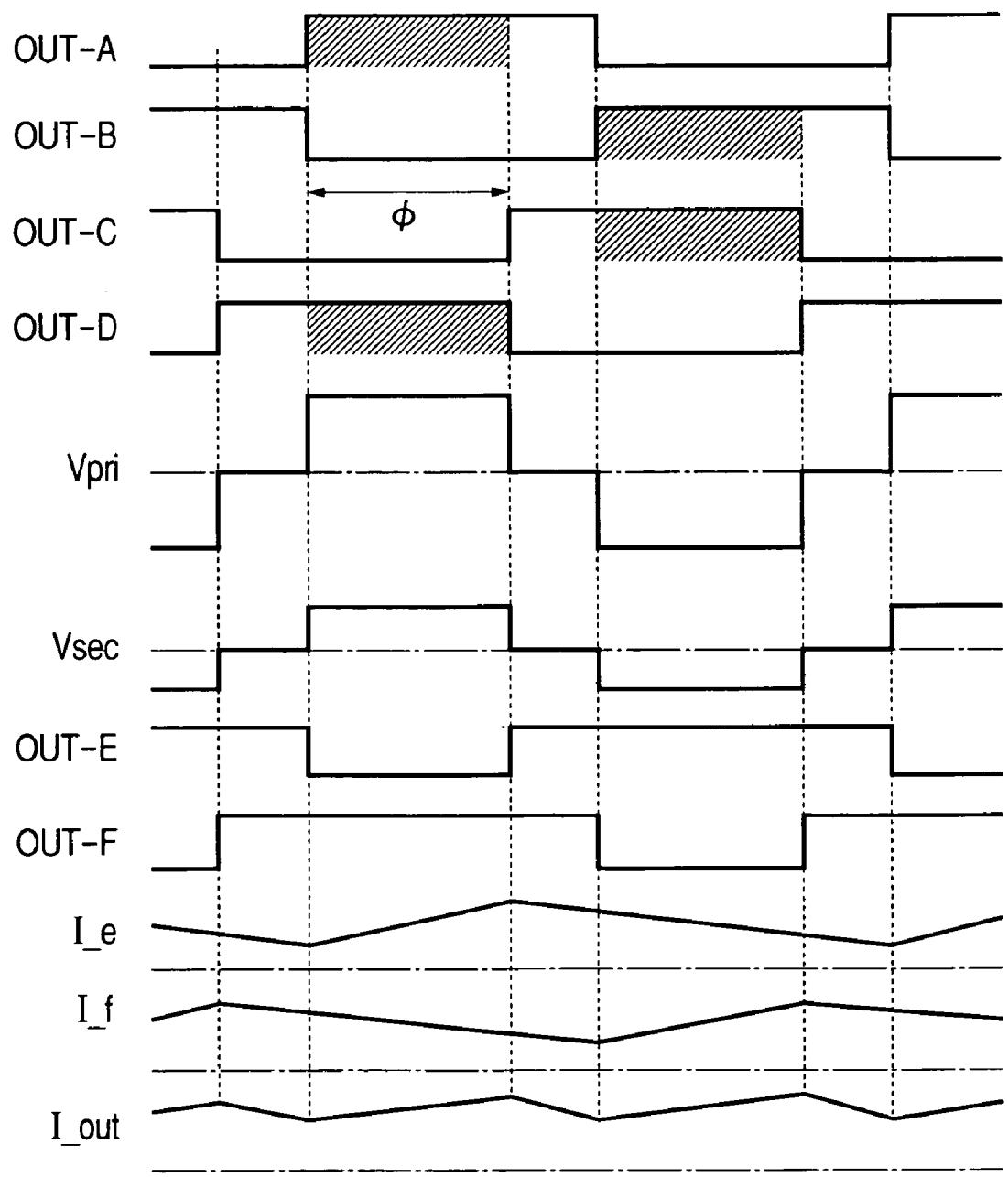
FIG. 18 is a timing chart showing changes in signals output from a power control IC in the conventional DC-DC converter, terminal voltages at the primary and secondary coils, and currents at the secondary side.

The following describes operations of the embodiment in FIG. 15 with reference to the timing chart in FIG. 16.

In order to minimize looses in the switch MOSFETs of the switching circuit 10, it is a good practice to turn on or off the switch when each source-drain voltage Vds becomes 0 V. FIGS. 16 (1) and (2) show a criterion for the source-drain voltage Vds and control signal timings according to the prior art. FIGS. 16 (3) and (4) show a criterion for the source-drain voltage Vds and control signal timings according to the embodiment. In both cases, the switch MOSFET M2 is used as an example.

As shown in FIG. 16 (1), the conventional control uses 0 V as a criterion for the source-drain voltage Vds. Under the control according to this criterion, the MOSFET M1 turns off at the timing t3. The coil's terminal voltage V11 falls sinusoidally and becomes minimum (0 V) at the timing t4. However, delays in the 0 V decision circuit 41 and the PWM control circuit 31 cause the control signal OUT-B to change with a delay of tx21 from the timing t4 as shown in FIG. 16

(2). The change of the control signal OUT-B causes the MOSFET M2 to actually shift from the off-state to the on-state with an additional delay of tx22, i.e., at timing t4x. At this time, the coil's terminal voltage V11 already exceeds the peak value and becomes higher than 0 V, causing a switching loss.

On the other hand, the embodiment optimally specifies the criterion voltage VBS as shown in FIG. 16 (3). The control signal OUT-B changes from the low level to the high level before the coil's terminal voltage V11 becomes minimum (0 V). The MOSFET M2 shifts from the off-state to the on-state at the time point when the coil's terminal voltage V11 becomes minimum (0 V). In other words, the embodiment configures the MOSFET M2 to shift from the off-state to the on-state at the time point when the coil's terminal voltage V11 becomes minimum (0 V). For this purpose, the criterion voltage VBS is predetermined at a point with an interval (tx21+tx22) earlier than the time point when the coil's terminal voltage V11 becomes minimum (0 V). The same applies to the other switch MOSFETs M1, M3, and M4. In this manner, it is possible to minimize losses in the switching circuit 10.

While the embodiment in FIG. 15 commonly uses the criterion voltage VBS for the four comparators CMP1 through CMP4, it may be preferable to provide four external terminals for individual settings. Alternatively, it may be preferable to use a criterion voltage VBS1 common to the comparators CMP1 and CMP3 and a criterion voltage VBS2 common to the comparators CMP2 and CMP4.

While there have been described specific preferred embodiments of the present invention made by the inventors, it is to be distinctly understood that the present invention is not limited thereto but may be otherwise variously embodied within the spirit and scope of the invention. According to the above-mentioned embodiment, for example, the rectifier circuit at the secondary side comprises the choke coils L1 and L2 and the synchronous rectification MOSFETs M5 and M6. Further, the rectifier circuit can function as a full-wave rectifier circuit by replacing the synchronous rectification MOSFETs M5 and M6 with diodes.

The embodiments use the MOSFETs M5 and M6 for synchronous rectification instead of diodes in order to decrease losses in forward voltages of the diodes. The present invention is effectively applicable when there is available either the MOSFET M5 or M6 for synchronous rectification. When the M5 is MOSFET, for example, it may be preferable to use a diode instead of the M6.

According to the embodiments, the output voltage Vout is directly input to the power control IC 30. When there is a large potential difference between the primary side and the secondary side and the insulation performance needs to be ensured, however, it is desirable to use a pulse transformer or a photo coupler to indirectly supply the output voltage Vout to the power control IC 30. Likewise, it may be preferable to use a pulse transformer or a photo coupler to indirectly supply the control signals OUT-E and OUT-F for turning on or off the synchronous rectification MOSFETs M5 and M6 that constitute the synchronous rectifier circuit 20.

Moreover, instead of directly picking up the output voltage Vout, it is also possible to supply a detected voltage level to the power control IC 30 by providing a resistance division circuit, a reference level generation circuit, a voltage comparison circuit, and an output voltage detection circuit. The resistance division circuit comprises a resistor serially connected between output terminals. The reference level generation circuit comprises a resistor and a diode serially connected between output terminals. The voltage comparison circuit is supplied with an input voltage comprising: a voltage divided by the resistance division circuit and; a reference level generated by the reference level generation circuit. The output voltage detection circuit comprises a resistor, a light-emitting diode, and the like connected between a voltage output terminal and an output terminal of the voltage comparison circuit.

The embodiments use the external terminals to directly input the setup values DLY1 through DLY3 as setup information for specifying delay amounts supplied by the variable delay circuit 33. Furthermore, the power control IC chip 30 may contain a register to set the information for specifying a delay amount or programmable elements such as a fuse and an EPROM element and a D/A conversion circuit. It may be preferable to generate the delay setup values DLY1 through DLY3 inside the chip from the preset information.

The following summarizes representative advantageous effects of the invention disclosed in this application concerned.

Since the present invention can decrease losses in the rectifier circuit at the secondary side, the DC-DC converter can be miniaturized by increasing the switching frequency. Since the present invention can also decrease losses at the primary side, the DC-DC converter can be further miniaturized. Despite a change in input voltages or output currents, it becomes possible to provide a DC-DC converter capable of decreasing losses by optimizing on-timings of the switch elements at the primary side and off-timings of the synchronous rectification transistors at the secondary side. It is also possible to decrease the number of external terminals for the semiconductor integrated circuit for power supply control constituting the DC-DC converter.

What is claimed is:

1. A semiconductor integrated circuit for power supply control for performing switching control of a switching power supply device which switches currents flowing through a primary coil of a transformer for voltage conversion to drive the primary coil with alternate currents and rectifies currents flowing through a secondary coil of the transformer to output DC voltages,
    wherein the semiconductor integrated circuit generates and outputs a control signal for dynamically controlling off-timings of a transistor for synchronous rectification at the secondary coil in accordance with at least one of an input voltage of the primary coil and a load current of the secondary coil to turn off the transistor immediately before inverting a current direction flowing through the primary coil so as to minimize switching power losses,
    timings of the control signal are variably delayed at delay amounts by a variable delay circuit, and
    said delay amounts are generated by a delay amount control circuit based upon setup information.

2. The semiconductor integrated circuit for power supply control according to claim 1,
    wherein the semiconductor integrated circuit generates and outputs a signal to dynamically control on-timings of a switching element for switching currents flowing through the primary coil in accordance with input voltages of the primary coil.

3. The semiconductor integrated circuit for power supply control according to claim 1,
    wherein the semiconductor integrated circuit generates and outputs a signal to dynamically control on-timings of a switching element for switching currents flowing through the primary coil in accordance with load currents at the secondary side.

4. The semiconductor integrated circuit for power supply control according to claim 1,
wherein the semiconductor integrated circuit generates and outputs a signal to dynamically control on-timings of a switching element for switching currents flowing through the primary coil in accordance with input voltages of the primary coil and load currents at the secondary side.

5. The semiconductor integrated circuit for power supply control according to claim 1,
wherein the semiconductor integrated circuit generates and outputs a control signal by turning on or off a first synchronous rectification transistor and a second synchronous rectification transistor,
the first synchronous rectification transistor being connected between one terminal of the secondary coil and a reference potential point and turned on or off in synchronization with a switching operation for switching currents flowing through the primary coil, and
the second synchronous rectification transistor being connected between the other terminal of the secondary coil and the reference potential point and turned on or off in synchronization with the switching operation at the primary side.

6. A semiconductor integrated circuit for power supply control for performing switching control of a switching power supply device which switches currents flowing through a primary coil of a transformer for voltage conversion to drive the primary coil with alternate currents and rectifies currents flowing through a secondary coil of the transformer to output DC voltages, comprising:
a first control signal generation circuit to generate a control signal used for switching currents flowing through the primary coil;
a second control signal generation circuit to generate control signals for the first and second synchronous rectification transistors at the secondary side based on a signal generated by the first control signal generation circuit;
a variable delay circuit capable of supplying any delay to control signals generated by the first and second control signal generation circuits;
an external terminal to input setup information for specifying a delay amount supplied by the variable delay circuit;
a delay amount control circuit to generate, based on setup information from the external terminal, a signal for controlling a delay amount in the variable delay circuit; and
a nullification means for nullifying delay amount control by the delay amount control circuit,
wherein the semiconductor integrated circuit generates and outputs a signal for dynamically controlling off-timings of a transistor for synchronous rectification at the secondary coil in accordance with at least one of an input voltage of the primary coil and a load current of the secondary coil,
the semiconductor integrated circuit generates and outputs a control signal by turning on or off a first synchronous rectification transistor and a second synchronous rectification transistor,
the first synchronous rectification transistor being connected between one terminal of the secondary coil and a reference potential point and turned on or off in synchronization with a switching operation for switching currents flowing through the primary coil,
the second synchronous rectification transistor being connected between the other terminal of the secondary coil and the reference potential point and turned on or off in synchronization with the switching operation at the primary side, and
the nullification means nullifies operations of the delay amount control circuit in accordance with a state of the external terminal.

7. The semiconductor integrated circuit for power supply control according to claim 6, comprising:
a detection means for detecting whether or not the load current goes below a specified value,
wherein, when the load current goes below a specified value, the variable delay circuit is changed to supply no delay to off-timings of the control signal for the first and second synchronous rectification transistors.

8. The semiconductor integrated circuit for power supply control according to claim 1, comprising:
a voltage monitoring means for detecting a level of the primary input voltage and, when the input voltage reaches a specified level, stops supplying power to an internal circuit,
wherein an input terminal for voltages monitored by the voltage monitoring means is also used as an input terminal for voltages of the primary coil which is monitored to control on-timings of the switching element for switching currents flowing through the primary coil.

9. The semiconductor integrated circuit for power supply control according to claim 6,
wherein information about load currents input to the first control signal generation circuit and information about load currents input to the delay amount control circuit are input from the same external terminal.

10. A semiconductor integrated circuit for power supply control for performing switching control of a switching power supply device which switches currents flowing through a primary coil of a transformer for voltage conversion to drive the primary coil with alternate currents and rectifies currents flowing through a secondary coil of the transformer to output DC voltages,
wherein the semiconductor integrated circuit is configured to selectively set any detection criterion level for a circuit to generate a signal which detects a voltage between terminals of a switching element in a circuit for switching currents flowing through the primary coil and controls on-timings of the switching element at time points when a terminal voltage of the primary coil becomes minimum so as to minimize switching power losses;
timings of said switching currents are variably delayed at delay amounts by a variable delay circuit, and
said delay amounts are generated by a delay amount control circuit based upon setup information.

11. A switching power supply device comprising:
a semiconductor integrated circuit for power supply control for performing switching control of a switching power supply device which switches currents flowing through a primary coil of a transformer for voltage conversion to drive the primary coil with alternate currents and rectifies currents flowing through a secondary coil of the transformer to output DC voltages,
wherein the semiconductor integrated circuit generates and outputs a signal for dynamically controlling off-timings of a transistor for synchronous rectification at the secondary coil in accordance with at least one of an input voltage of the primary coil and a load current of the secondary coil to turn off the transistor immediately before inverting a current direction flowing through the primary coil so as to minimize switching power losses;

a transformer for voltage conversion;

a switching circuit which switches currents flowing through the primary coil of the transformer for voltage conversion to drive the primary coil with alternate currents;

a rectifier circuit including a synchronous rectification transistor and rectifies currents flowing through a secondary coil to output DC voltages, the synchronous rectification transistor being connected between one terminal of the secondary coil of the transformer for voltage conversion and a reference potential terminal and turned on or off in synchronization with switching operations of the switching circuit;

a capacitor element for smoothing voltages rectified by the rectifier circuit;

a variable delay circuit variably delaying timings of said currents flowing through the primary coil of the transformer by delay amounts; and a delay amount control circuit generating said delay amounts based upon setup information, wherein an input voltage to the primary coil is divided by resistors and is supplied to the semiconductor integrated circuit for power supply control.

12. A switching power supply device according to claim 11,
wherein the semiconductor integrated circuit generates and outputs a signal to dynamically control on-timings of a switching element for switching currents flowing through the primary coil in accordance with input voltages of the primary coil.

13. A switching power supply device according to claim 11,
wherein the semiconductor integrated circuit generates and outputs a signal to dynamically control on-timings of a switching element for switching currents flowing through the primary coil in accordance with load currents at the secondary side.

14. A switching power supply device according to claim 11,
wherein the semiconductor integrated circuit generates and outputs a signal to dynamically control on-timings of a switching element for switching currents flowing through the primary coil in accordance with input voltages of the primary coil and load currents at the secondary side.

15. A switching power supply device according to claim 11,
wherein the semiconductor integrated circuit generates and outputs a control signal by turning on or off a first synchronous rectification transistor and a second synchronous rectification transistor,
the first synchronous rectification transistor being connected between one terminal of the secondary coil and a reference potential point and turned on or off in synchronization with a switching operation for switching currents flowing through the primary coil, and
the second synchronous rectification transistor being connected between the other terminal of the secondary coil and the reference potential point and turned on or off in synchronization with the switching operation at the primary side.

16. A switching power supply device, comprising:

a semiconductor integrated circuit for power supply control for performing switching control of a switching power supply device which switches currents flowing through a primary coil of a transformer for voltage conversion to drive the primary coil with alternate currents and rectifies currents flowing through a secondary coil of the transformer to output DC voltages, wherein the semiconductor integrated circuit generates and outputs a signal for dynamically controlling off-timings of a transistor for synchronous rectification at the secondary coil in accordance with at least one of an input voltage of the primary coil and a load current of the secondary coil;

a transformer for voltage conversion;

a switching circuit which switches currents flowing through the primary coil of the transformer for voltage conversion to drive the primary coil with alternate currents;

a rectifier circuit including a synchronous rectification transistor and rectifies currents flowing through a secondary coil to output DC voltages, the synchronous rectification transistor being connected between one terminal of the secondary coil of the transformer for voltage conversion and a reference potential terminal and turned on or off in synchronization with switching operations of the switching circuit;

a capacitor element for smoothing voltages rectified by the rectifier circuit;

a first control signal generation circuit to generate a control signal used for switching currents flowing through the primary coil;

a second control signal generation circuit to generate control signals for the first and second synchronous rectification transistors at the secondary side based on a signal generated by the first control signal generation circuit;

a variable delay circuit capable of supplying any delay to control signals generated by the first and second control signal generation circuits;

an external terminal to input setup information for specifying a delay amount supplied by the variable delay circuit;

a delay amount control circuit to generate, based on setup information from the external terminal, a signal for controlling a delay amount in the variable delay circuit; and a nullification means for nullifying delay amount control by the delay amount control circuit, wherein an input voltage to the primary coil is divided by resistors and is supplied to the semiconductor integrated circuit for power supply control, and the nullification means nullifies operations of the delay amount control circuit in accordance with a state of the external terminal.

17. A switching power supply device according to claim 11,
a detection means for detecting whether or not the load current goes below a specified value,
wherein, when the load current goes below a specified value, the variable delay circuit is changed to supply no delay to off-timings of the control signal for the first and second synchronous rectification transistors.

18. A switching power supply device according to claim 11,
   a voltage monitoring means for detecting a level of the primary input voltage and, when the input voltage reaches a specified level, stops supplying power to an internal circuit,
   wherein an input terminal for voltages monitored by the voltage monitoring means is also used as an input terminal for voltages of the primary coil which is monitored to control on-timings of the switching element for switching currents flowing through the primary coil.

19. A switching power supply device according to claim 11,
   wherein information about load currents input to the first control signal generation circuit and information about load currents input to the delay amount control circuit are input from the same external terminal.

20. A switching power supply device according to claim 11,
   wherein the semiconductor integrated circuit is configured to be able to set any detection criterion level for a circuit to generate a signal which detects a voltage between terminals of a switching element in a circuit for switching currents flowing through the primary coil and controls on-timings.

21. The semiconductor integrated circuit for power supply control according to claim 1, wherein said delay amounts are nullified by a nullification means.

22. The semiconductor integrated circuit for power supply control according to claim 10, wherein said delay amounts are nullified by a nullification means.

23. The switching power supply device according to claim 11, further comprising a nullification means for nullifying said delay amounts.

\* \* \* \* \*